US012367314B1

(12) United States Patent
Bogatov et al.

(10) Patent No.: US 12,367,314 B1
(45) Date of Patent: Jul. 22, 2025

(54) DYNAMIC DATABASE REDACTION USING PROTECTED SECRET MATERIAL

(71) Applicant: Amazon Technologies, Inc., Seattle, WA (US)

(72) Inventors: Dmytro Bogatov, Boston, MA (US); Kiran Kumar Chinta, Fremont, CA (US); Todd Jeffrey Green, Davis, CA (US); Yanzhu Ji, Sunnyvale, CA (US); James Claiborne Moore, Boston, MA (US); Gaurav Saxena, Cupertino, CA (US); Abhishek Rai Sharma, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 18/058,821

(22) Filed: Nov. 25, 2022

(51) Int. Cl.
G06F 21/62 (2013.01)
H04L 9/32 (2006.01)

(52) U.S. Cl.
CPC ........ *G06F 21/6254* (2013.01); *H04L 9/3242* (2013.01)

(58) Field of Classification Search
CPC ............................ G06F 21/6254; H04L 9/3242
See application file for complete search history.

(56) References Cited

U.S. PATENT DOCUMENTS

| 4,825,391 A | 4/1989 | Merz |
| 5,751,967 A | 5/1998 | Raab et al. |
| 8,473,410 B1 | 6/2013 | Haggerty et al. |
| 10,867,063 B1 | 12/2020 | Avanes et al. |
| 11,341,270 B2 * | 5/2022 | Reeve ................. G06F 21/6254 |
| 11,567,943 B1 | 1/2023 | Blum et al. |
| 11,593,521 B1 | 2/2023 | Balakrishnan et al. |
| 11,783,078 B1 | 10/2023 | Li et al. |
| 2003/0014394 A1 | 1/2003 | Fujiwara et al. |
| 2006/0238799 A1 | 10/2006 | Kidokoro |
| 2011/0029473 A1 | 2/2011 | Van Lunteren |
| 2012/0054095 A1 | 3/2012 | Lesandro et al. |
| 2012/0197919 A1 | 8/2012 | Chen et al. |

(Continued)

OTHER PUBLICATIONS

Non-Final Office Action, U.S. Appl. No. 18/058,816, Oct. 25, 2024, 25 pages.

(Continued)

*Primary Examiner* — Yonas A Bayou
(74) *Attorney, Agent, or Firm* — Nicholson De Vos Webster & Elliott LLP

(57) ABSTRACT

Techniques for dynamic database redaction using protected encryption secret material are described. A masking policy is defined that includes a reference to a secret material stored by a secrets manager service. The masking policy further identifies a pseudonymous redaction function that utilizes a cryptographic function requiring such a secret material. The secrets manager service is configured to grant access to the secret material by an entity of the database service that executes queries, such as a leader node of a cluster. For a particular query, the cluster obtains the secret material from the secrets manager service in a secure manner, uses the secret material for applying the cryptographic function to values for redaction purposes, and deletes any copies of secret material thereafter.

20 Claims, 18 Drawing Sheets

(56) References Cited

U.S. PATENT DOCUMENTS

| | | | |
|---|---|---|---|
| 2013/0019276 A1* | 1/2013 | Biazetti | G06F 21/6218 726/1 |
| 2013/0060820 A1 | 3/2013 | Bulusu et al. | |
| 2013/0117313 A1 | 5/2013 | Miao et al. | |
| 2014/0032928 A1* | 1/2014 | Taskaya | H04L 63/0428 713/189 |
| 2014/0096184 A1 | 4/2014 | Zaitsev | |
| 2015/0095647 A1* | 4/2015 | Lachterman | H04W 12/033 713/168 |
| 2015/0150075 A1 | 5/2015 | Vahlis et al. | |
| 2015/0358433 A1 | 12/2015 | Parthasarathy et al. | |
| 2015/0358434 A1 | 12/2015 | Parthasarathy et al. | |
| 2016/0164679 A1* | 6/2016 | Song | G06F 21/6254 713/155 |
| 2017/0005788 A1* | 1/2017 | Irvine | H04L 63/0428 |
| 2017/0039387 A1 | 2/2017 | Leonardi et al. | |
| 2017/0272472 A1 | 9/2017 | Adhar | |
| 2018/0060365 A1 | 3/2018 | Mujumdar et al. | |
| 2018/0307859 A1 | 10/2018 | Lafever et al. | |
| 2019/0229905 A1 | 7/2019 | Fan et al. | |
| 2019/0319925 A1 | 10/2019 | Chalvadi et al. | |
| 2020/0301917 A1 | 9/2020 | Niu et al. | |
| 2020/0311304 A1 | 10/2020 | Parthasarathy | |
| 2020/0327252 A1 | 10/2020 | McFall et al. | |
| 2020/0396210 A1* | 12/2020 | Taylor | H04L 9/32 |
| 2021/0157948 A1 | 5/2021 | Avanes et al. | |
| 2021/0286894 A1 | 9/2021 | Avanes et al. | |
| 2022/0092213 A1 | 3/2022 | Hou | |
| 2022/0100900 A1 | 3/2022 | Baldwin et al. | |
| 2022/0164477 A1 | 5/2022 | Patodia | |
| 2022/0215107 A1 | 7/2022 | Wong et al. | |
| 2022/0405420 A1* | 12/2022 | Tommasi | G06F 21/78 |
| 2022/0407861 A1 | 12/2022 | Beecham et al. | |
| 2022/0414601 A1 | 12/2022 | Shek et al. | |
| 2023/0005391 A1 | 1/2023 | Sharma et al. | |
| 2023/0130637 A1 | 4/2023 | Hosudurg et al. | |
| 2023/0169198 A1 | 6/2023 | Blum et al. | |
| 2023/0281326 A1 | 9/2023 | Magalsky | |
| 2024/0111896 A1* | 4/2024 | McGrath | G06F 21/6254 |
| 2024/0134660 A1 | 4/2024 | Eberlein et al. | |

OTHER PUBLICATIONS

Non-Final Office Action, U.S. Appl. No. 18/058,820, Sep. 24, 2024, 43 pages.

Peter et al. "Query-Driven Enforcement of Rule-Based Policies for Data-Privacy Compliance"—Published—2019 (Peter hereinafter) (Year: 2019).

Final Office Action, U.S. Appl. No. 18/058,816, Feb. 28, 2025, 29 pages.

Non-Final Office Action, U.S. Appl. No. 18/058,819, Dec. 18, 2024, 16 pages.

* cited by examiner

*EXEMPLARY PSEUDONYMIZED MASKING FUNCTIONS 300*

| PSEUDONYMOUS MASKING FUNCTIONS 302 | EXAMPLE PSEUDONYMOUS MASKING FUNCTION INVOCATIONS 304 | EXAMPLE PSEUDONYMOUS MASKING FUNCTION OUTPUTS 306 |
|---|---|---|
| REDACT_SSN (INPUT, KEY_IDENTIFIER='') | REDACT_SSN ('555-20-8132', 'SECRETS:EAST:3124') | > '434-87-8132' |
| REDACT_EMAIL(INPUT, REDACT_DOMAIN, KEY_IDENTIFIER='') | REDACT_EMAIL('TEST@EXAMPLE.COM', FALSE, 'SECRETS:EAST:3124')<br>REDACT_EMAIL('TEST@EXAMPLE.COM', TRUE, 'SECRETS:EAST:3124') | > 'jFur6D6l@EXAMPLE.COM'<br>> 'jFur6D6l@4u1x66Vc.17F' |
| REDACT_DATE(INPUT, REDACT_DAY, REDACT_MONTH, REDACT_YEAR, KEY_IDENTIFIER='') | REDACT_DATE ('04/03/1989',TRUE,TRUE,FALSE, 'SECRETS:EAST:3124') | > '07/25/1989' |
| REDACT_CREDIT_CARD (INPUT, KEY_IDENTIFIER='') | REDACT_CREDIT_CARD('6011556448579458', 'SECRETS:EAST:3124') | > '6011556539601945 8' |
| HMAC_SHA256(INPUT, SECRET_KEY_IDENTIFIER='') | LEFT(HMAC_SHA256('BINGO','SECRETS:EAST:3124'), 20) | >"3ECFFA2C89A0EC11CE85" |

*FIG. 3*

REPRESENTATION
OF POLICIES
ATTACHED TO A
TABLE 1000

REPRESENTATION
OF MASKING
POLICIES 1032

```
POLICY1:    INPUT=(COL1,COL2,COL3,COL4,COL5)
            OUTPUT=(COL1,COL2,COL3,COL4,COL5,COL6)
  COL1 = LEFT(SHA2(COL1+COL2, 256), 10)
  COL2 = RIGHT(SHA2(COL1+COL2, 256), 10)
  COL3 = REDACT_SSN(COL3)
  COL4 = REDACT_DATE(COL4, TRUE, TRUE, TRUE)
  COL5 = REDACT_EMAIL(COL5, TRUE)
  COL6 = "XXXXXXXXXXXXXXXX"

POLICY2:    INPUT=(COL1, COL2, COL3)
            OUTPUT=(COL1, COL2, COL3)
  COL1 = REDACT_CREDIT_CARD(COL1)
  COL2 = REDACT_DATE(COL2, TRUE, TRUE, FALSE)
  COL3 = REDACT_EMAIL(COL3, FALSE)

POLICY3:    INPUT=(COL1,COL2,COL3,COL4)
            OUTPUT=(COL1,COL2,COL3,COL4)
  COL1 = COL1
  COL2 = REDACT_CREDIT_CARD(COL2, SECRET_KEY)
  COL3 = REDACT_DATE(COL3, TRUE, TRUE, FALSE, SECRET_KEY)
  COL4 = REDACT_EMAIL(COL4, FALSE, SECRET_KEY)
```

REPRESENTATION
OF ATTACHMENTS
1033

```
ATTACHMENT1:   INPUT=(FIRST_NAME,LAST_NAME,SSN,BIRTHDAY,EMAIL)
               OUTPUT=(FIRST_NAME,LAST_NAME,SSN,BIRTHDAY,EMAIL,CC_NUM)
      RELATION=CUSTOMERS TABLE
      POLICY=POLICY1
      ROLE=*
      PRIORITY=0

ATTACHMENT2:   INPUT=(CC_NUM,BIRTHDAY,EMAIL)
               OUTPUT=(CC_NUM,BIRTHDAY,EMAIL)
      RELATION=CUSTOMERS TABLE
      POLICY=POLICY2
      ROLE="SALES_ANALYST"
      PRIORITY = 1

ATTACHMENT3:   INPUT=(LAST_NAME,CC_NUM,BIRTHDAY,EMAIL)
               OUTPUT=(LAST_NAME,CC_NUM,BIRTHDAY,EMAIL)
      RELATION=CUSTOMERS TABLE
      POLICY=POLICY3
      ROLE="DATASCIENTIST"
      PRIORITY = 2
```

*FIG. 10*

OPERATIONS
1500

RECEIVE A REQUEST TO EXECUTE A QUERY INVOLVING AT LEAST A COLUMN OF A RELATION OF A DATABASE 1502

EXECUTE THE QUERY TO GENERATE A RESULT, COMPRISING MODIFYING VALUES OF THE COLUMN BASED ON USE OF SECRET MATERIAL AND A PSEUDONYMOUS REDACTION FUNCTION IMPLEMENTED BY THE DATABASE SERVICE TO YIELD MODIFIED VALUES FOR THE RESULT, WHEREIN EXECUTING THE QUERY COMPRISES: OBTAINING A COPY OF THE SECRET MATERIAL, FROM A SEPARATE SYSTEM, VIA USE OF AN IDENTIFIER OF THE SECRET MATERIAL 1504

*FIG. 15*

DYNAMIC DATABASE REDACTION USING PROTECTED SECRET MATERIAL

BACKGROUND

In many modern organizations, data stored in various data stores (e.g., database type systems such as relational database management systems, data lakes, etc.) may need to be accessed by different users for different purposes. However, some or all of the data may be sensitive and require protection from disclosure to un-authorized users. This is a challenging task, as the data may need to be stored in its true form, but made available to different users in different forms—e.g., original, partially redacted, completely redacted, etc.

One technique for implementing data protections is referred to as dynamic data masking. Dynamic data masking is a data masking technique that limits sensitive data exposure by masking it for all non-authorized users and allows data teams to specify the type and extent of sensitive data non-authorized users can access. Dynamic data masking can be configured on designated databases to conceal personally identifying information (PII) in the result sets of queries, without making any physical changes to the original production data. This can significantly simplify security design, and coding in the application layer, with minimal impact. Data masking tools that enable a dynamic approach are invaluable to enterprises because they minimize the risk of a data breach and/or data security noncompliance, while providing developers and other users adequate access to databases.

BRIEF DESCRIPTION OF DRAWINGS

Various examples in accordance with the present disclosure will be described with reference to the drawings, in which:

FIG. 3 is a diagram illustrating pseudonymous masking functions for dynamic data masking according to some examples.

FIG. 10 is a diagram illustrating example logical representations of various masking policies attached to various columns of a table according to some examples.

FIG. 15 is a flow diagram illustrating operations of a method for dynamic database redaction using protected secret material according to some examples.

DETAILED DESCRIPTION

Figure 1:
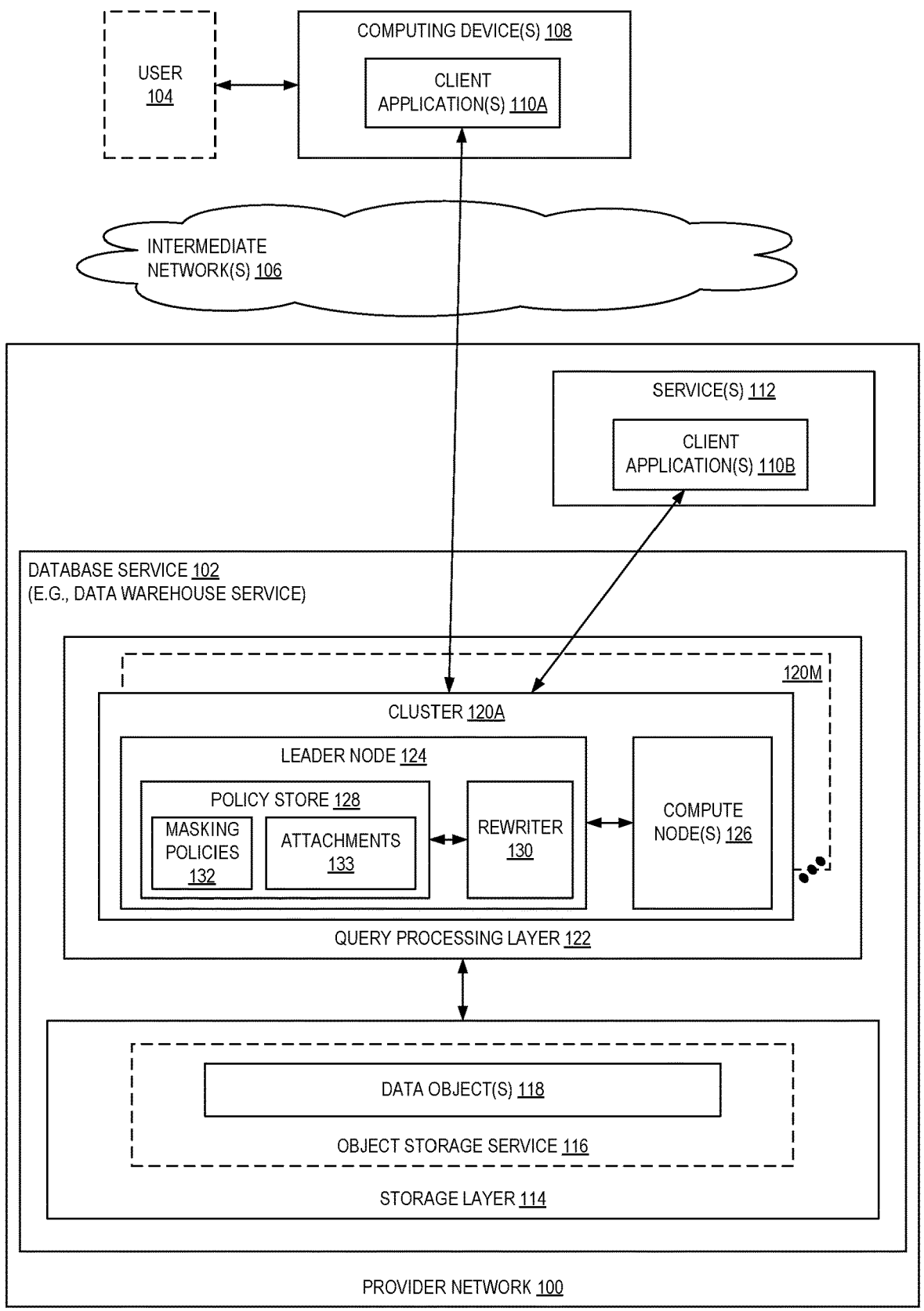
FIG. 1 is a diagram illustrating a database environment in a multi-tenant service provider network that implements user-configurable dynamic data masking according to some examples.

The present disclosure relates to methods, apparatus, systems, and non-transitory computer-readable storage media for configurable dynamic data masking in a database environment. According to some examples, a database system such as a relational database, data warehouse management service, etc., allows users to define masking policies for use in controlling what types of data are available to various users of the system.

In some examples, the database system allows users to define masking policies as standalone objects that can be flexibly created and updated independent of particular relations (e.g., tables, views, materialized views, etc.) or columns of data (of the relations) to be masked. These masking policies can be defined by users through identifying an expected set of inputs as well as a masking expression that operates using the expected set of inputs. Users can issue commands to "attach" (or associate or apply) the masking policies to one or multiple columns of one or more relations, and in some examples can cause these policies to be applied for all users, particular users, groups of users, roles used by users, etc.

Moreover, in some examples, masking policies can be attached to relations along with associated user-specified priority values. Priority values can be numeric values (e.g., "0" or "100") that can straightforwardly be configured to allow for the clear resolution of conflicting attached masking policies. Thus, if multiple masking policies may apply for a particular access to a particular set of columns—such as a first policy being specific to the querying user or their role and a second policy that is applicable to another role assumed by the user—the priority values associated with the attached policies can be analyzed to determine which policy is to be applied. For example, the policy that is attached with a highest priority value is selected. This can allow for safe and easily understood configuration of masking policies to provide differentiated access to data, such as by applying restrictive masking policies by default for all users but configuring higher-priority masking polices to alternatively be applied for particular users or roles of users that may need different or less-restrictive access to the data. In some examples, policy attachments for a particular user, group, or organization can be flexibly set by a user (e.g., an administrator), and the system can ensure conflict-free resolution, such as by requiring that all priority values configured in some particular scope are different.

In some examples, the masking expression can make use of built-in pseudonymous redaction functions that provide a way to deterministically mask values while producing type-adherent masked values as outputs. As is known in the art, the term "pseudonymous data" may generally refer to the concept of data that has been de-identified from the data's subject but can be re-identified as needed (as opposed to anonymous data, which has been changed so that reidentification of the underlying data subject is impossible).

The system may support a variety of such pseudonymous redaction functions, such as functions to mask dates (e.g., various date formats, datetime type values, or the like), telephone numbers, email addresses, national identification numbers (such as social security numbers (SSNs)), account numbers (e.g., credit card numbers, bank account routing and/or account numbers), addresses (e.g., to show only a city and state, to show only a ZIP code, etc.), phone numbers (e.g., to redact some or all of a number), a drivers license number, passport number, names (e.g., to change a last name to only include a first initial, such as changing "Singh" to "S"), an amount of money (e.g., rounding an amount, putting into a range such as $50,000-$60,000, etc.), order numbers (e.g., redacting everything except from a last few digits), etc. These pseudonymous redaction functions can be configured to generate masked values in a type-adherent way, such that the redacted or masked output remains semantically correct for that type of value—e.g., a masked date is still a valid date, a masked email address is still of a valid email format, and the like—preventing dependent applications that utilize the masked values from failing due to their assumptions or requirements. Moreover, the pseudonymous redaction functions can make use of a cryptographic function (such as a hash-based message authentication code (HMAC) type function) in a manner to deterministically and thus consistently generate a same masked value for a same set of input values assuming the use of a same item of secret material (e.g., a key), allowing users of the masked values to retain the unique (or semi-unique) nature of these values for particular records, allowing for JOINs across relations, and the like. As used herein, the term "cryptographic function" is to be broadly construed as a deterministic function of inputs creating pseudorandom outputs.

In some examples, the pseudonymous redaction functions can be configured to use a user-provided secret material item (e.g., a key) in a safe and secure manner. Instead of placing a secret material item directly within a masking policy, which is valid though disfavored for security reasons, a user may provide an identifier associated with the secret material within a masking policy. This identifier can be, for example, a unique identifier associated with a secret material stored by a separate, secure secrets storage type system, which can be used to obtain the secret material in a secure manner. The secrets storage type system can thus store the secret material in a secure manner and be configured to grant access to the secret material to the database itself—e.g., a leader node of a cluster of nodes that execute queries—though not the involved user executing queries or other users. Thus, the database can access the secret material in a secure manner (via encrypted messages and/or tunnels) from the secrets storage type system for a short period of time while executing a query, and immediately securely delete the secret material when it is no longer needed for executing the query.

Accordingly, various embodiments disclosed herein provide users a powerful, customizable, secure, and straightforward set of techniques and systems for creating and managing potentially complex sets of dynamic data masking policies.

FIG. 1 is a diagram illustrating a database environment in a multi-tenant service provider network 100 that implements user-configurable dynamic data masking according to some examples. In FIG. 1, a database service 102 is implemented as part of a multi-tenant service provider network 100 and may offer database services to users 104 and their client applications 110A-110B. The database service 102 can be implemented as software, hardware, or a combination of both software and hardware in one or multiple locations of the provider network 100 and thus may be or include distributed aspects. In some examples, however, user-configurable dynamic data masking can be implemented in other environments, such as within a private network or data center, etc.

Generally, a provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services (e.g., services 112, database service 102), such as a hardware virtualization service that can execute compute instances, a storage service (e.g., an object storage service 116) that can store data objects, etc.

Users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format and/or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") may refer to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service (e.g., service(s) 112) that a provider network may provide (e.g., to implement client application(s) 110B) may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service 114 can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, a database service 102 may perform dynamic data masking for its users. The database service 102 may be a variety of types of services, such as a relational database service that implements relational database management systems, a cloud data warehouse service to provide management and/or querying services against underlying data stores such as data lakes, a NoSQL type database service implementing key-value NoSQL databases, an in-memory caching/database service, a document database service, a distributed and/or "big data" database service, a graph database service, a time-series database service, a ledger database service, a database migration service, etc.

In some examples described herein, the database service 102 may comprise a data warehouse service providing an enterprise-class relational database query and management system. The data warehouse service can support client connections with many types of applications 110, including business intelligence (BI), reporting, data, and analytics tools. The data warehouse service can provide efficient storage and optimum query performance through a combination of massively parallel processing, columnar data storage, and very efficient, targeted data compression encoding schemes. For example, the database service 102 can integrate with various data loading and ETL (extract, transform, and load) tools and BI reporting, data mining, and analytics tools.

As shown in FIG. 1, in this example the database service 102 includes one or more clusters 120A-120M that form a query processing layer 122. A cluster 120 can be made up of one or more compute nodes 126, and in some examples, if a cluster is provisioned with two or more compute nodes 126, an additional leader node 124 coordinates the compute nodes 126 and handles external communication. Thus, a client application 110 can interact directly only with the leader node 124, which then communicates with the compute nodes 126 to perform tasks such as executing queries. Thus, the compute nodes 126 may be "transparent" (or invisible) to external applications. In some examples, the nodes 124/126 of the cluster may be dynamically scaled (to add and/or remove nodes) by the database service 102 automatically on behalf of their users, e.g., based on the load of these nodes, to increase or decrease capacity/performance of the cluster. In other examples, nodes 124/126 of the cluster may be taken from a general pool or fleet of available nodes, and in some examples, the compute nodes 126 can be offered by a separate service or system than the leader node 124.

In some examples, a cluster 120 implements, in whole or in part, one or more databases. User data can be stored on the compute nodes 126, while a database client (e.g., a SQL client) of the client applications 110A-110B communicates with the leader node 124, which in turn coordinates the execution of the query with the compute nodes. The database service 102 can form a relational database management system (RDBMS), and thus be compatible with other RDBMS applications. The database service 102 in some examples provides the same functionality as a typical RDBMS, including online transaction processing (OLTP) functions such as inserting and deleting data, though it can be especially optimized for high-performance analysis and reporting of very large datasets.

In some examples, the leader node 124 manages communications with client applications 110A-110B and communications with compute nodes 126. The leader node 124 receives queries from client applications 110A-110B and parses them to develop execution plans to carry out database operations, in particular, the series of steps necessary to obtain results for complex queries. Based on the execution plan, the leader node 124 can compile code, distribute the compiled code to the compute nodes 126, and assign a portion of the data to each compute node 126.

The leader node 124, in some examples, distributes structured query language (SQL) statements to the compute nodes 126 when a query references tables that are stored on the compute nodes 126. In other cases, other queries may run more centrally on the leader node 124. For example, in some cases the database service 102 implements certain SQL functions only on the leader node 124.

As indicated above, the leader node 124 may compile code for individual elements of the execution plan and assign the code to individual compute nodes 126. The compute nodes 126 run the compiled code to generate intermediate results and then send these intermediate results back to the leader node 124 for final aggregation.

Each leader node 124 and/or compute node(s) 126 can be implemented as a containerized application or as an application executed by a virtual machine (compute instance). The leader node 124 and/or compute node(s) 126 of a cluster 120 can thus be executed by a single host computing device or by multiple host computing devices at a single location (e.g., rack, row, room, data center, building, AZ) or multiple such locations. In some examples, each compute node 126 has its own dedicated resources (e.g., processing resources such as one or more CPU cores, memory resources, etc.), which are determined by a "type" of the node (e.g., a type of compute instance, such as a type offered by a hardware virtualization service of the cloud provider network). As the database's workload grows, the compute capacity of a cluster 120 can be scaled up by increasing the number of nodes, upgrading the node type, or both.

The underlying data of the databases can be stored in a separate storage layer 114. For example, a set of data objects 118 (e.g., unstructured or structured text files in formats such as Comma Separate Value (CSV) or JavaScript Object Notation (JSON), spreadsheets, formatted document files, database files, etc.) can be a managed storage layer 114 backed by an object storage service 116. In this configuration, compute and storage can be scaled independently, so that uses can size their clusters 120 based only on their compute needs. In some examples, the storage layer 114 automatically uses high-performance SSD-based local storage as a tier-1 cache. The storage layer 114 can also take advantage of optimizations, such as data block temperature, data block age, and workload patterns to deliver high performance while scaling storage automatically when needed without requiring any action on the part of the users. However, this architecture presents one example, and many other storage architectures can be utilized, such as the use of block storage volumes provided in part by a block-storage service (e.g., Amazon Elastic Block Store (EBS)™), instance-local storage (e.g., implemented on a same computing device as the instance), etc.

In some examples, a compute node 126 can be partitioned into slices. Each slice is allocated a portion of the node's memory and disk space, where it processes a portion of the workload assigned to the node. The leader node 124 can manage distributing data to the slices and apportion the workload for queries or other database operations to the slices. The slices then work in parallel to complete the operation. The number of slices per node can be determined by the node size of the cluster.

When a user creates a table, in some examples the user can optionally specify a column as the distribution key. When the table is loaded with data, the rows are distributed to the node slices according to the distribution key that is defined for a table, which allows the database service to effectively use parallel processing to load data and run queries efficiently.

The database service 102 can take advantage of high-bandwidth connections, close proximity, and custom communication protocols to provide private, very high-speed network communication between the leader node 124 and compute nodes 126. For example, the compute nodes 126 can run on a separate, isolated network that client applications 110A-110B are not able to access directly.

As described herein, many organizations need to restrict access to particular types of information to be on a need-to-know basis for legal, regulatory, contractual, political, or other reasons. For example, users may need to obfuscate Personal Identifying Information (PII) to both comply with mandatory regulations such as the European privacy law General Data Protection Regulation (GDPR), the Payment Card Industry Data Security Standard (PCI-DSS), the United States health information privacy act (HIPAA), the California Privacy law (CCPA), the Korean Privacy law (Personal Information Protection Act), and many others. Further, these and other regulations are continually being added and refined. Thus, the evolving data privacy landscape requires that organizations either undergo expensive migrations to tokenization services or implement dynamic data masks that show only limited data to data warehouse users.

Thus, for data warehouse users, a team owning the data warehouse has to do expensive ETL to tokenize personal information into some type of redacted or hashed form. Those migration processes are difficult to audit, time/resource expensive to undertake, and difficult to maintain over time. Further, these teams may need to tokenize this information into multiple different formats that are useful for multiple different types of users and securing access to these formats presents a continuing challenge.

Accordingly, examples described herein allow users of a data management system such as a database system or data warehouse management service to configure masking policies to define what data is sensitive, what users or types of users can access the data, and in what form the data is to be provided to the users. These users can also define hashing policies that obfuscate sensitive data from particular sets of users and can define multi-input and/or multi-output policies that makes it simpler for conditional data masking, e.g., whereby different records in a relation may have different privacy needs. Moreover, some examples allow users to define a variety of policies to be applied in different contexts in a straightforward manner, as it is easy to reason as to which policies apply to which columns and when.

As shown in FIG. 1, the database service 102 can perform dynamic data masking via use of a rewriter 130 and a policy store 128, which in some examples is implemented within a leader node 124, though the policy store 128 may alternatively be more centrally stored (not at the leader node 124) by the database service 102 and accessed via network communications, instead.

The policy store 128 may include a variety of data structures storing a set of masking policies 132 defined by the user(s) associated with the particular database(s) of the cluster 120 as well as a set of attachments 133 indicating which masking policies 132 are attached to which columns, relations, users, user groups, etc.

For example, masking policies 132 may track metadata of the policy itself such as what column(s) serve as the input, what are their data types, what masking expression is to be applied (e.g., in some language such as SQL, using user-defined functions (UDFs), etc.). The attachments 133 data structure(s) can track the association of policies to particular columns and/or relations and/or columns, with associated priority values as described herein, etc.

With this information of the policy store 128, the leader node 124 (via the rewriter 130) can re-write queries to cause the queries to dynamically data mask the data of the database (s) based on the context associated with a query, such as the columns involved, the particular querying user, any groups or roles that the user is associated with, and the like. For example, for a particular received query involving a column of a table, the leader node 124 can determine which masking policies 132 (if any) are attached to the column, and select the appropriate masking policy to be applied based on user information (such as an identifier of the user, any roles or groups that the user is a part of), and re-write the query to cause the necessary data masking to be implemented. The re-writing, in some examples, may include inserting a new subquery into the query (to replace some of the original query) that generates masked data, and this rewriting can be performed straightforwardly by those of skill in the art for a variety of types of statements, such as SELECT queries, INSERT statements, UPDATE statements, DELETE statements, and the like. Alternatively, various types of statements can be re-written using typical table logic, or other portions of queries can be replaced in a relatively straightforward manner. This re-written query can thus be sent out to ones of the compute nodes 126 for execution (or executed directly by the leader node 124).

Figure 2:
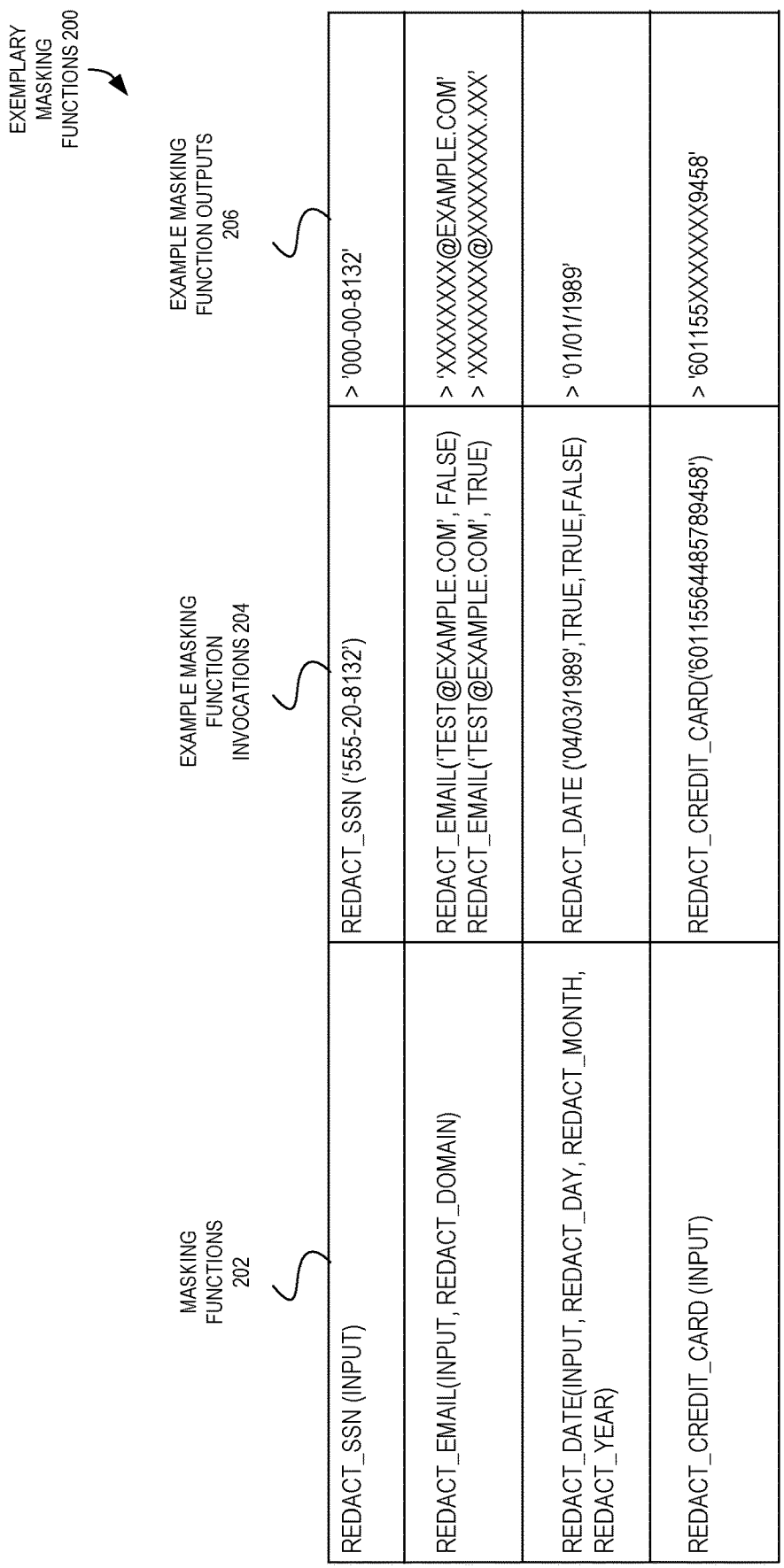
FIG. 2 is a diagram illustrating masking functions for dynamic data masking according to some examples.

Turning ahead, FIG. 2 is a diagram illustrating masking functions 200 for dynamic data masking according to some examples. As indicated herein, users can define masking expressions that indicate how to mask values from a database. The masking expressions can reference (or include) various "helper" functions, such as ones of the set of masking functions 202 in FIG. 2, which can be implemented by the cluster to perform dynamic data masking, i.e., to "redact" or otherwise mask or obfuscate data values for querying clients.

Here, the masking functions 202 include a type-specific masking function for masking a particular type of governmental identification number, here, a social security number (from the United States)—REDACT_SSN. This function can redact some of the values in the social security number, e.g., by replacing the first five digits as shown (e.g., with "0" values), replacing all of the digits with zero values, or the like. Thus, the input will be nine-digit number (optionally with dash characters) and the output will similarly be a nine-digit-number (optionally with dash characters).

Another masking function 202 is a type-specific masking function REDACT_EMAIL for redacting email addresses, which may include an argument indicating whether the domain portion of the email address (i.e., the portion of the email address after the ampersand) is to be redacted or not, in addition to the default where the username portion of the email address is redacted (i.e., the portion of the email address prior to the ampersand). In some examples, the username portion can be replaced with a string of values (e.g., eight characters of "X", or a same number of characters as in the original username) while the domain portion can similarly be replaced. As shown with two example invocations 204, the email address "TEST@EXAMPLE.COM" can be redacted to either "XXXXXXXX@EXAMPLE.COM" or "XXXXXXXX@XXXXXXXX.XXX".

A REDACT_DATE masking function 202 is a type-specific masking function for redacting date values, though this or similar functions can be developed for datetimes, time values, timestamps, etc. In this example, the function can accept a date as an input, together with one or more arguments specifying whether the "day" portion of the date, the "month" portion of the date, and/or the "year" portion of the date are to be redacted. For a redacted date portion, the value can be replaced with a predefined value—e.g., a day or month will be set to "01" while the year will be set to "1900." As shown in the example invocation 204, the day and month portions of an input date ("04/03/1989") are masked while the year is left as-is, resulting in an output date of "01/01/1989".

Finally, a financial account number masking function is provided that masks these account numbers, such as credit card numbers, debit card numbers, bank account numbers, bank routing numbers, or the like. Here, a REDACT_CREDIT_CARD function is provided that replaces a portion (or all) of the credit card number with a nonce value (here, "X"). In this example, the middle five or six digits, depending on the length/type of the credit card number provided, are replaced with an "X" value.

Thus, these functions can be used by users to craft masking expressions for inclusion in masking policies to be applied to columns of data.

While these functions are enormously helpful, modified versions thereof that utilize cryptographic techniques can be used that provide deterministic masking based on the use of secret material values. For example, FIG. 3 is a diagram illustrating pseudonymous masking functions 300 for dynamic data masking according to some examples. These pseudonymous counterparts (of the functions of FIG. 2) operate differently, as the redacted portions are not filled with placeholder values (like zeros or "X"s), but are instead pseudonymized. For example, the values that are to be redacted (e.g., an email username, the first digits of an SSN, the day and month of the date, etc.) will be consumed by an HMAC function (that produces a key-dependent hash of the input) to yield an output value (e.g., a long random-looking, or pseudorandom string) that can be deterministically transformed back to the original data type (e.g., alphanumeric in case of email, or digits in the case of the SSN, etc.). Accordingly, the output of the pseudonymous redaction function will remain semantically correct—e.g., the email address is still a valid email address, the date is still of a valid date format, etc., to prevent "breaking" client applications 110A-110B that rely upon these values being type correct. Additionally, the output value remains sufficiently redacted so that there is no feasible way to get the un-redacted value from the redacted value. Moreover, the output values are deterministic for a same secret material, so that a user with the same HMAC key (or secret material) would mask the same value (e.g., in different tables) to the same mask, allowing for operations such as JOINs and later queries to reference the same elements of these relations (as the hashed values do not change).

As shown, the pseudonymous masking functions 300 are similar to their counterparts in FIG. 2, though these include an optional final argument serving to identify a particular secret material item (e.g., a key) to be used for the underlying cryptographic operations utilized to generate the masked outputs. This identifier—here shown as "SECRETS: EAST:3124"—can be a type of identifier that is useable by the cluster to obtain the secret material for use. Thus, instead of including a secret material item itself directly within the masking policy, which is highly unsecure, the cluster can use the identifier to obtain the secret material for use, and then immediately discard the secret material when the use is over. Furthermore, this allows for the secret material to be stored securely elsewhere, such as by a secure secrets storage type service, and users may limit access to the secret material to only particular actors, such as the cluster or the leader node itself. Additionally, in some cases the secure secrets service can automatically perform secret material rotations (by replacing a key with another key), further increasing the security of the underlying data by eliminating risks associated with compromised secret material (e.g., encryption keys). Further, in some examples, the secret material argument may be optional, whereby the database service 102 can utilize a default item of secret material, a secret material item of its own choosing, etc.

As shown, the pseudonymous masking functions 302 can include a REDACT_SSN function that generates a social security number by encrypting some or all of the input value (here, "555-20-8132") via use of an HMAC type function and deterministically transforming the encrypted output into five digits using techniques known or derivable to those of skill in the art, e.g., by utilizing a modulo operator, by taking a right or left number of digits, etc. Thus, in this example, the first five digits of the SSN are modified—in a deterministic way via a common item of secret material—while the last four digits remain the same. Similarly, the pseudonymous masking functions 302 can include a REDACT_EMAIL function that can replace portions of the input email address based on the cryptographic output (e.g., of an HMAC function using the identified secret material as the key together with the input email address) to deterministically modify the account and/or domain data of the email address.

Likewise, the pseudonymous masking functions 302 can include a REDACT_DATE function that masks some or all of the input date. For example, the function may encrypt some or all of the input date, based on use of any indicated secret material, and use the resultant output to deterministically generate a masked date. For example, a first few bytes of the output could be used with a modulo operator to generate a month value (e.g., a value between one and twelve), while a next few bytes of the output could be used with a different modulo operator to generate a day value (e.g., between one and twenty-eight, or with more complex logic to ensure that a day value is selected within a range allowable for the particular month, such as going up to a value of thirty-one for December), and if needed, another defined set of bytes of the output could be used with a different modulo operator to generate a year value (e.g., within some range of years, such as 1900 to a current year, or 1971 to 2050, or 1900 to 2100, as a few examples).

Similarly, the pseudonymous masking functions 302 can include a REDACT_CREDIT_CARD function that deterministically masks an inputted credit card number by replacing some portions or the entirety of the input number in a deterministic manner. As shown, using the identified secret material, some or all of the input value can be encrypted to generate an output value, where that output value can be used to generate numbers for use in masking—here, six digits in the middle are replaced, which allows for downstream use of the beginning and ending digits of the card, which are known to provide meaning for research purposes. For example, in some cases, a first digit may be a card's major industry identifier (MII), the next five digits of a credit card number may identify a card issuer (as an issuer identification number (IIN) or bank identification number (BIN)), the next six to twelve digits may reflect an individual's account number, and the last digit may provide a card verification "check" digit for use in validation (e.g., generated by use of a Luhn algorithm). Thus, some of these portions may be masked (e.g., part or all of the account number) for protection, while allowing other portions to be viewed for other types of analysis (e.g., bank identifiers).

The masking functions 302 also include an HMAC function that deterministically generates an output based on a value of an input value and a key/secret material. As is known, in cryptography, an HMAC (sometimes also expanded as either "keyed-hash message authentication code" or "hash-based message authentication code") is a type of message authentication code (MAC) involving a cryptographic hash function and a secret cryptographic secret material item (e.g., a key). In this example, the masking function 202 is named HMAC_SHA256, indicating (among other things) that it utilizes SHA as the underlying hash algorithm, which generates a 256-bit output. Of course, in various examples different algorithms and versions thereof can be similarly provided, e.g., HMAC_SHA384 or HMAC_SHA512. In this example, along with the input, the function can optionally accept an identifier of a secret material to be used—here, a unique reference to a secret material made available by a separate secrets manager service of the provider network—though use without such an optional argument may cause the database service to use a secret material of its own choosing. An example invocation of this function, shown as a corresponding example masking function invocation 204, includes an input (here, the string "BINGO") and an identifier of a secret material ("SECRETS:EAST:3124"), which the database service can use to obtain the secret material to be used. This generates an obfuscated value, and per the invocation 204, the leftmost twenty characters of this outputted value are saved ("3ecffa2c89a0ec11ce85").

Thus, in some examples, the database service 102 provides built-in, ready-to-use common redaction functions that run natively, allowing the functions to run as fast as possible, and users do not have to create their own similar functions, saving time and effort. Moreover, users will see a semantically correct masked value which can be further used in applications. For example, if an application expects a valid email address (and crashes otherwise), this mechanism will achieve privacy without breaking the functionality. Further, the generated redacted values are both random looking (i.e., pseudorandom) while remaining deterministic. The latter property is critical for analytical queries (a common use-case for data warehouse users) because it allows for JOIN consistency. For example, if an analyst needs to JOIN two tables over an SSN value, they will see the correct result (with overwhelming probability) even though the SSN is masked. This way, the built-in redaction functions innovatively allow both functionality and privacy.

Figure 4:
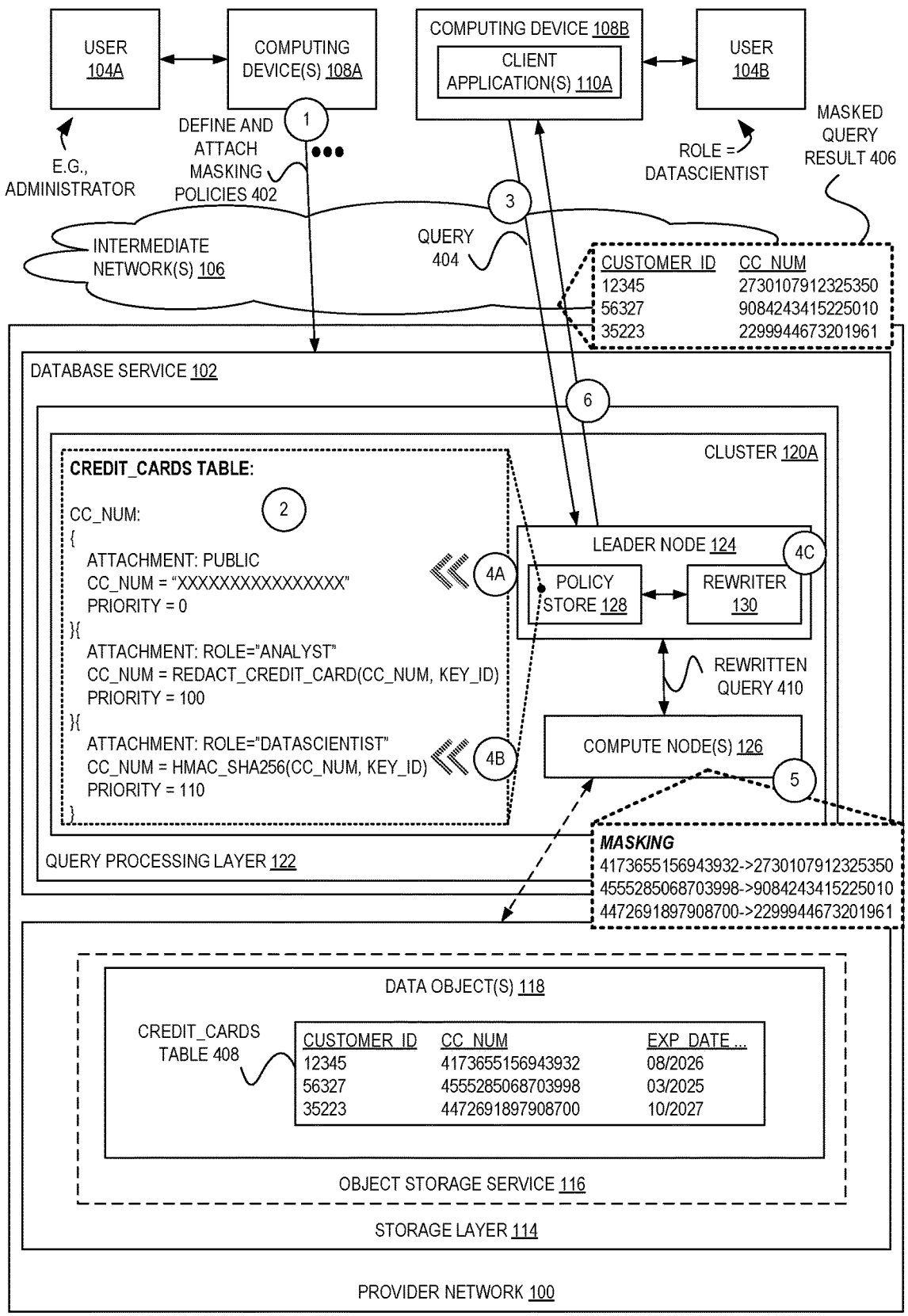
FIG. 4 is a diagram illustrating masking policy creation and use in a database environment within a multi-tenant service provider network that implements user-configurable dynamic data masking according to some examples.

FIG. 4 is a diagram illustrating masking policy creation and use in a database environment within a multi-tenant service provider network that implements user-configurable dynamic data masking according to some examples.

As indicated above, a user 104 (via use of a computing device 108A such as a desktop computer, laptop, tablet, smartphone, or other type of device) can interact with the database service 102 as shown at circle (1) to create and attach a set of masking policies 402. For example, the database service 102 may support a variety of function calls (e.g., API calls or otherwise) such as "create masking policy", "alter masking policy", "drop masking policy" ~, "attach masking policy", "detach masking policy", etc., for use in creating, updating, deleting, attaching, and detaching masking policies on relations such as tables, views, materialized views, etc. Examples signatures for supported function calls could include:

```
CREATE MASKING POLICY [ IF NOT EXISTS ]
    masking_policy_name WITH ( input_columns )
    USING ( masking_expression )
    [ MASK-ON-INGEST ];
ATTACH MASKING POLICY policy_name ON
{ table_name | view_name | mv_name }
    (output_columns_names) [USING (input_column_names)]
    TO { user_name | ROLE role_name | PUBLIC }
    [ PRIORITY priority ];
DETACH MASKING POLICY policy_name ON
{ table_name | view_name | mv_name }
    (output_column_names)
    FROM { user_name | ROLE role_name | PUBLIC };
ALTER MASKING POLICY masking_policy_name WITH
(masking_column data_type)
    USING ( masking_expression );
DROP MASKING POLICY policy_name;
```

Users may thus define masking policies for use and "attach" them (e.g., associate them) for use with particular columns of particular tables. The creation of a masking policy, as reflected herein by the create masking policy command, may include the user providing a name for the policy, an indication of input values it operates on, a masking expression that indicates how to mask the input values, and an optional indication of whether the values should be masked upon ingestion into the system.

Likewise, the attach masking policy command may allow a user to provide the name of the (existing) masking policy to be attached, together with an identifier of what relation it is to be attached to—e.g., a table name, a view name, a materialized view name, etc. The user also specifies what set of column(s) should be masked, optionally with a set of columns to be used as input for the masking policy (e.g., when they are different than the set of output columns). The user also specifies who the policy is to apply to—e.g., an identifier of a particular user or group of users, an identifier of a role (e.g., of a role-based access control (RBAC) system) that itself is associated with one or more users, or an identifier that the policy applies to all users (e.g., PUBLIC). The user may also provide a priority value, which can be used to allow the system to determine which masking policy is to be applied in the case where multiple such policies are applicable.

As will be later shown in additional detail, a user may configure a variety of masking policies that can be attached to a same set of columns, where these policies may be applied differently based on the context of the query of interest. For example, as shown by circle (2), we assume that a set of policies have been defined and attached to a CC_NUM column of a CREDIT_CARDS table—a first policy where the column is masked with a static value of multiple "X"s that is broadly applicable to all users with a priority of zero, a second policy to be applied for users having a role of "analyst" where the credit card number is redacted using a pseudonymous redaction function with a user-provided secret material, and a third policy to be applied for users having a role of "datascientist" where the credit card number is redacted using an HMAC function and the user-provided secret material. Note, however, that this provides a logical view of the masking policies and attachments, and in many implementations this information can be stored in multiple different data structures—e.g., policies in one data structure, and attachments in another.

Upon issuance of a query at circle (3) from a client application 110A (executed by a computing device 108B) where the querying user 104B utilizes a role of "datascientist", the query is received at the leader node 124 of the cluster 120A. The leader node 124 then determines which, if any, dynamic data masking policies may apply to the query. This determination may be based on the context of the query, such as identifiers of tables and/or columns referenced by the query, and by an identifier of the associated user account and/or roles associated with that user, where this information may be provided by another control plane service of the provider network and/or by the database service 102 itself.

Thus, the determination can include identifying all attached policies for the involved table(s) and column(s), and on a column-by-column basis, determining which of these policies are candidate policies that could apply. For example, all attachments that are marked PUBLIC (and thus applicable to all queries) are included, and all attachments corresponding to the particular user and any of the user's roles are included. In this case, we assume that both the first public policy (shown at circle (4A)) and the third "datascientist" role policy (shown at circle (4B)) are identified as candidate policies for the CC_NUM column referenced by the query—e.g., "SELECT CUSTOMER_ID, CC_NUM FROM CREDIT_CARDS".

The leader node 124 may then determine which of these candidate policies are to be applied, for values of the column, based on use of the attachments' priority values for these policies. In this case, the first public policy has a priority value of zero, while the third datascientist policy has a priority value of one-hundred and ten. In this example, the higher priority value is the one that "wins," and thus, the leader node 124 identifies the third policy as the one to apply.

The leader node 124 then causes its rewriter 130 logic, based on the masking expression of the selected policy, to re-write the user's query. For example, in this figure the masking expression is represented as "CC_NUM=HMAC_SHA256(CC_NUM, KEY_ID)" and thus the leader node 124 can obtain the secret material using the KEY_ID value (e.g., from a separate storage system discussed elsewhere herein), and rewrite the query based on the expression. For example, in some examples, the rewriter 130 may replace the table identifier from the query with a subquery that generates masked values—e.g.,

```
SELECT customer_id, cc_num FROM
(SELECT customer_id, HMAC_SHA256(cc_num, key_id)
AS cc_num FROM credit_cards)
AS credit_cards;
```

In this example, the subquery—reflected by the above within the parenthesis—includes a command obtain the customer_id values and to use the HMAC function with the identified secret material to generate a column of masked cc_num values. These two values are then obtained by the "outer" query portion (i.e., the first line of the query) and returned.

Thus, this rewritten query 410 is sent to the compute node(s) 126 at circle (5), optionally along with the secret material itself as described elsewhere herein, where the compute node(s) 126 may obtain (or have previously obtained) the underlying data for the table from the storage layer 114 (or from its own, "local" storage), and execute the re-written query (with use of the now-native HMAC function) to generate masked results that are passed back to the leader node 124 and ultimately back to the client application 110A as query result 406. Note that this result includes all of the customer ID values from the illustrated credit cards table 408, though the associated CC_NUM values have been properly masked according to the "winning" policy.

Notably, as indicated herein, resolution of masking policies can occur on a column-by-column basis, and thus multiple policies can be used for masking multiple columns for a single query. Thus, it is possible that a single policy (that generates output values for two columns) may only be used to mask values for one of these columns when another policy has a higher priority value for the other column.

Figure 5:
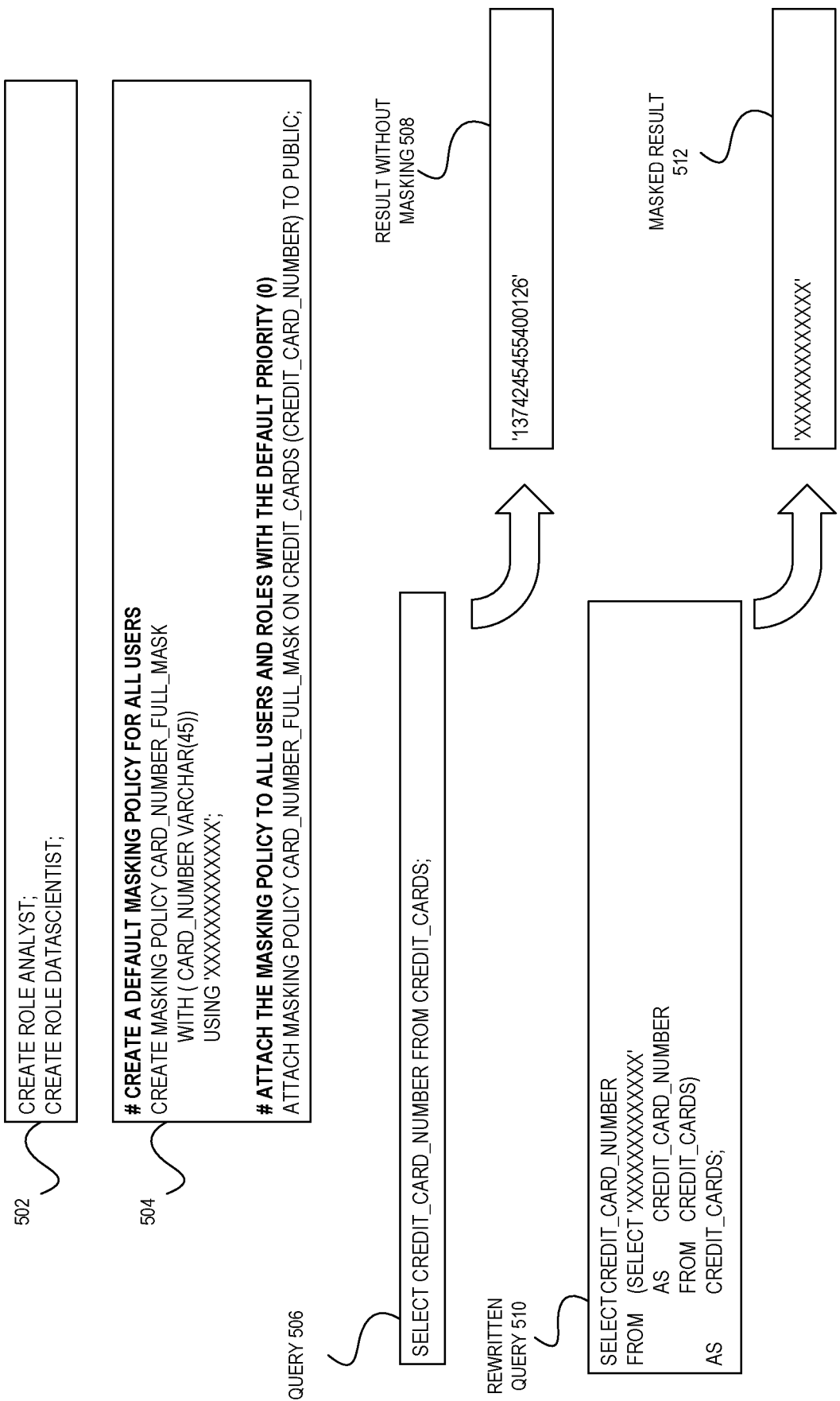
FIG. 5 is a diagram illustrating user-configured masking policy creation and attachment for dynamic data masking using a constant redaction technique according to some examples.
Figure 6:
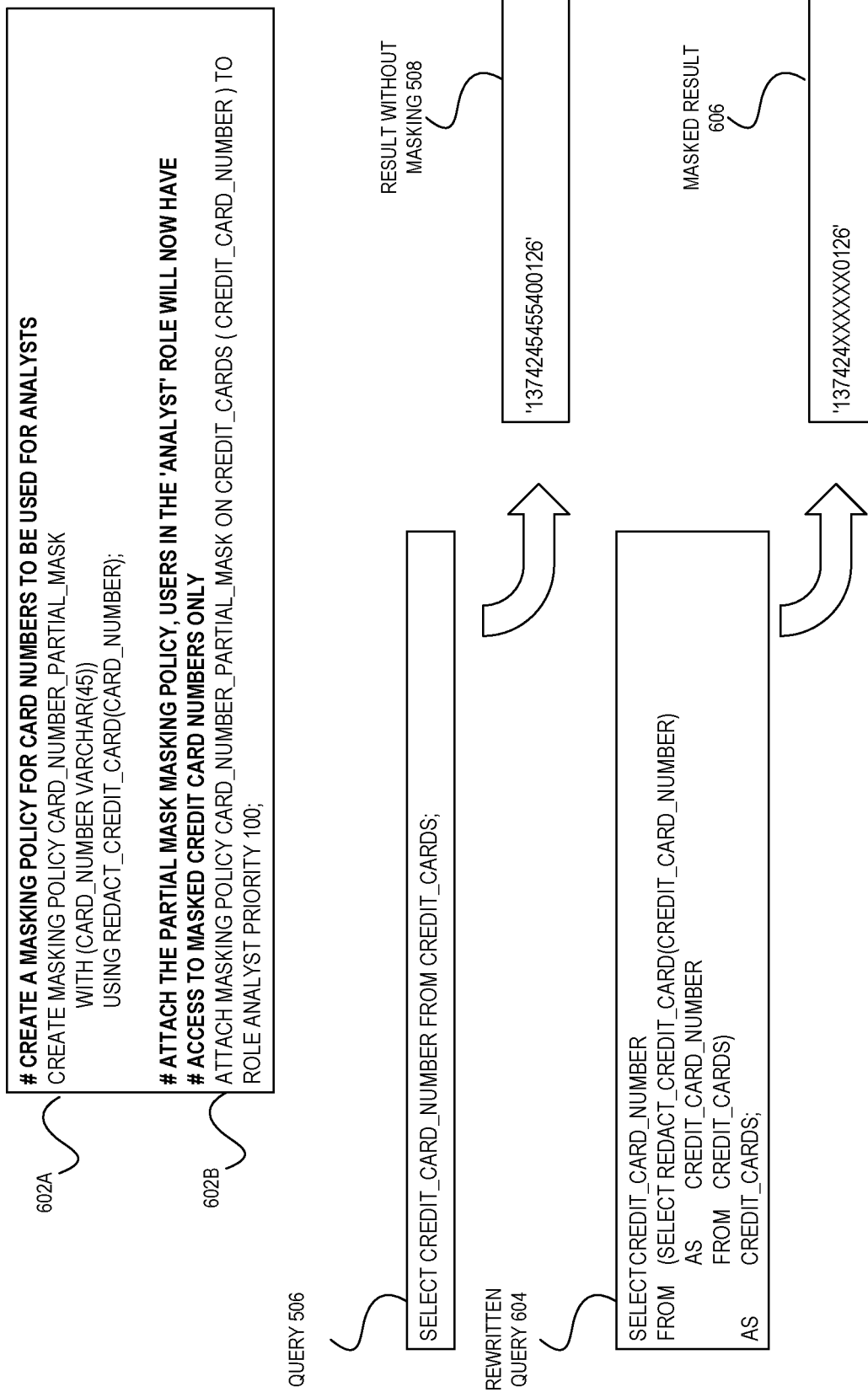
FIG. 6 is a diagram illustrating user-configured masking policy creation and attachment for dynamic data masking using a partial masking function according to some examples.
Figure 7:
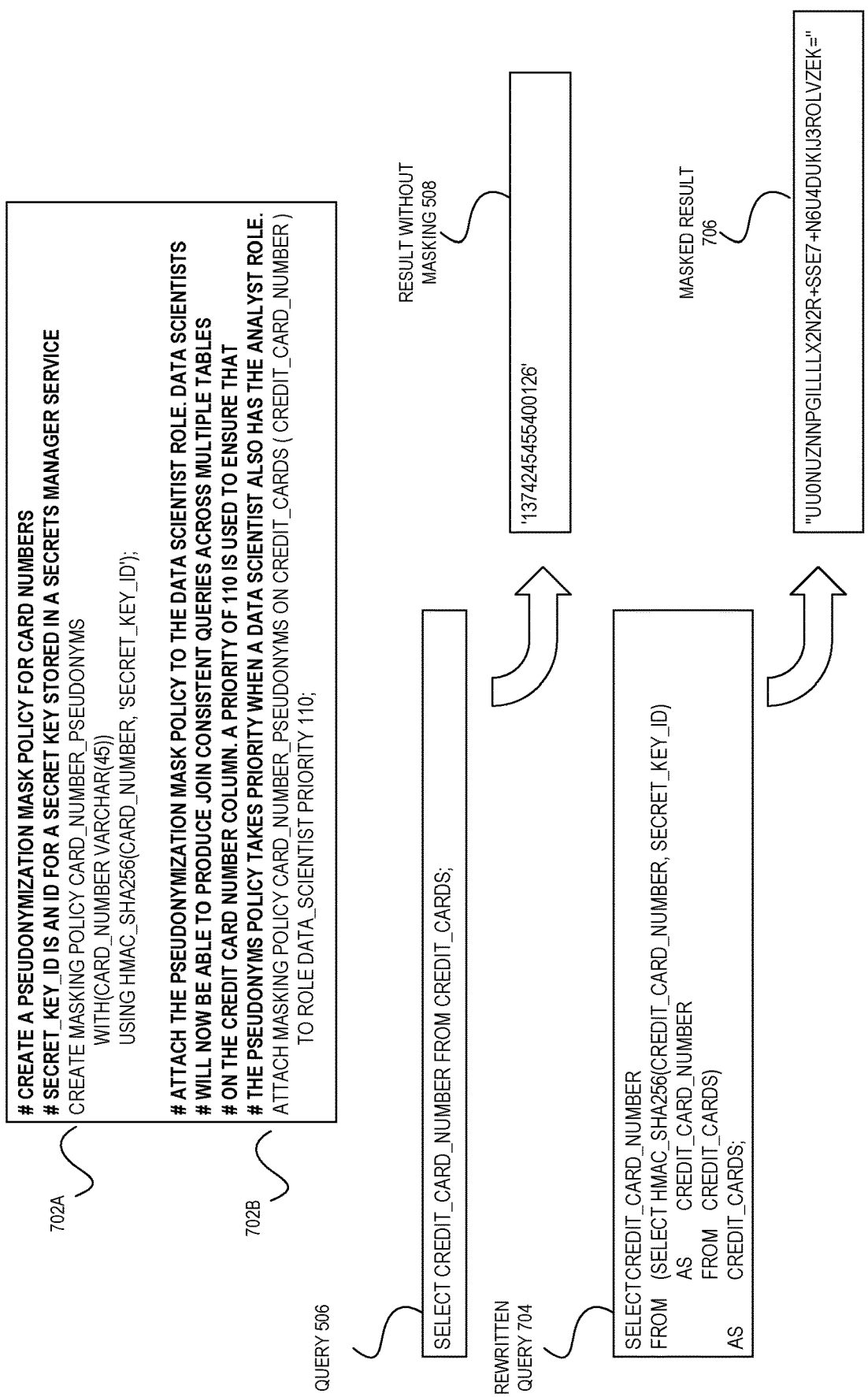
FIG. 7 is a diagram illustrating user-configured masking policy creation and attachment for dynamic data masking using a pseudonymous masking function according to some examples.

By way of more specific examples, a user may create a set of masking policies and attach these policies as shown in FIG. 5-FIG. 7. FIG. 5 is a diagram illustrating user-configured masking policy creation and attachment for dynamic data masking using a constant redaction technique according to some examples. In this example, assuming the existence of a table named CREDIT_CARDS with a single record/row, at 502 a first user role "analyst" and a second user role "datascientist" are created.

At 504, a create masking policy command is shown, named CARD_NUMBER_FULL_MASK, that creates a default masking policy that is applicable to all users. This masking policy simply replaces the input value (referenced as CARD_NUMBER) with a string constant made up of multiple 'X' characters. Accordingly, a default exists that fully masks out credit card numbers. This masking policy is then attached to the CREDIT_CARDS table using its column CREDIT_CARD_NUMBER as both the input to the masking policy and as the output column where the masked values will be inserted. As no priority value is provided, this attachment occurs with a default priority value of zero.

Prior to this policy being created and attached, a simple SQL query 506 seeking all credit card numbers would return the original credit card value as shown in result 508. However, with this policy created and attached, the query would be rewritten as query 510 (to include a subquery that generates the masked values), resulting in a new masked result 512.

Similarly, the policy created and attached at 504 can be used in other ways for other types of database statements, such as UPDATE statements. For example, a statement including a portion of "UPDATE CREDIT_CARDS SET my_field=credit_card_number . . . " could be rewritten according to the policy to "UPDATE CREDIT_CARDS SET my_field='XXXXXXXXXXXXXXXX' . . . ", which can prevent indirect accesses to columns that are directly protected.

A user may also create and attach another policy involving the same column of the same table. FIG. 6 is a diagram illustrating user-configured masking policy creation and attachment for dynamic data masking using a partial masking function according to some examples.

As shown, the customer may send a command at 602A to create another masking policy, where the command includes an identifier of a name for the policy ("card_number_partial_mask") that identifies an input value and defines a masking expression, which here passes the input value through a REDACT_CREDIT_CARD built-in function. At 602B, an attach command is provided that causes this policy to be attached to the credit_cards table using the credit_card_number as the input and output. This attachment is made specifically for those users having a role of "analyst" (e.g., a role identifier is thus provided) and the priority value is set to one-hundred.

In this case, independent of all other policies, a simple SQL query 506 seeking all credit card numbers would return the original credit card value as shown in result 508.

However, if the context of the query leads to the new policy being chosen for use, such as the calling user being associated with a role of "analyst" and this attachment's priority value exceeds all other priority values of candidate policies applicable for this use, the query 506 would be rewritten as query 604 (to include a subquery that references the redact_credit_card function), and thus the masked result 606 generated by the use of the redact_credit_card function masks out a number of middle numbers by replacing them with "X" characters. Of course, if this policy was implemented together with the policy of FIG. 5, and if the querying user was not associated with the analyst role, then—all other things being the same—the default policy created via 504 would be chosen for use, and the masked result 512 would again be generated and returned.

Additionally, or alternatively, a user may create and attach a masking policy involving the use of cryptographic functions. FIG. 7 is a diagram illustrating user-configured masking policy creation and attachment for dynamic data masking using a pseudonymous masking function according to some examples. As shown, at 702A a user can create a masking policy on the same column with a masking expression referencing an HMAC_SHA256 function, which also provides an identifier of a secret material (e.g., a storage location, URI, secret manager service unique identifier, or the like)—though not the secret material itself—that can be obtained and used for executing this function. At 702B, the user can attach this masking policy to the credit_cards table, though the attachment is only for users having a role of "data_scientist" and the priority value is one-hundred and ten.

In this example, instead of returning the original text in the result 508 for a simple query 506, when the policy is selected for use (e.g., due to the querying user being associated with the role of "data_scientist" and no other masking policies applying that have a higher priority value), the query 506 is rewritten into query 704, which includes a subquery replacing the "FROM" table that generates the proper masked result 712, which is a portion of (or all of) the result of the HMAC function as indicated. Though not illustrated, the user could have also configured a masked policy for this use case using the built-in pseudonymous REDACT_CREDIT_CARD variant in much the same way, which would again make use of a secret material item to deterministically generate masked values as described herein.

As indicated herein, masking policies can be attached to tables in straightforward ways that allow users to determine how the policies will be applied to a variety of different end-users. For example, a user may define many different policies for a particular column of data that should be applied in different ways for many different users. Embodiments disclosed herein allow for the straightforward attachment of policies in a way that is both easy-to-understand and easy-to-update through use of users/roles and attachment-specific priority values.

Figure 8:
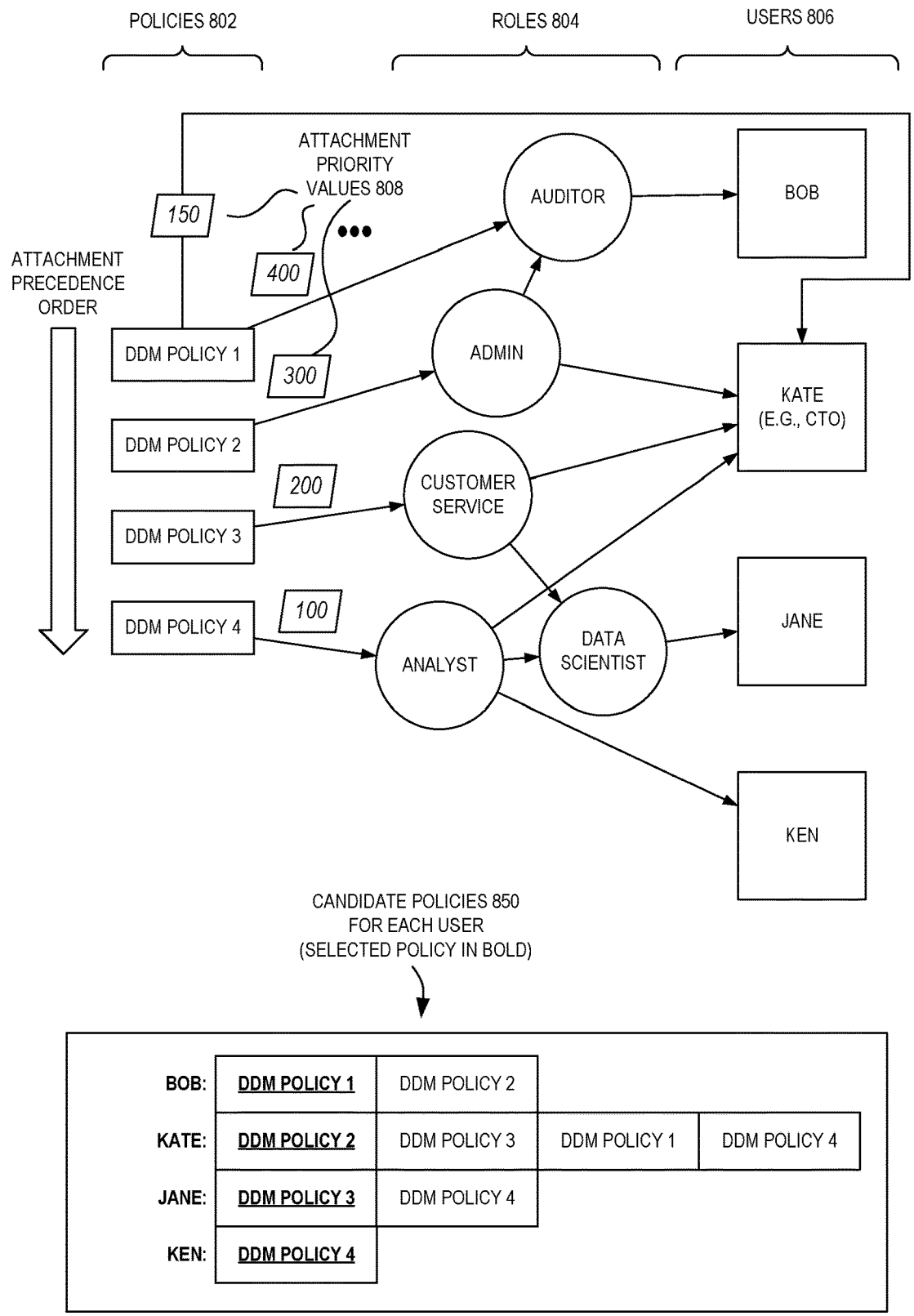
FIG. 8 is a diagram illustrating masking policy role attachment and conflicting policy resolution via priority values according to some examples.

FIG. 8 is a diagram illustrating masking policy role attachment and conflicting policy resolution via priority values according to some examples. As illustrated, a set of four different policies 802 can be attached for use with a particular set of one or more columns according to an attachment precedence order. This attachment precedence order can be created by a user by setting different priority values for each attachment. For example, a most restrictive/protective policy (e.g., DDM policy "1") can be attached with a comparatively highest priority value 808 (e.g., "400"), whereas a next most restrictive/protective policy (e.g., DDM policy "2") can be attached with a lower priority value (e.g., "300"), and so on.

As shown, these policies can be attached to different roles 804 of users 806 within an organization, such as by attaching DDM Policy "1" to the role of "auditor", DDM Policy "2" to the role of "admin", DDM Policy "3" to the role of "customer service", and DDM Policy "4" to the role of "analyst." Moreover, policies can be attached more directly to users, e.g., DDM Policy "1" is attached directly to user "Kate."

Further complicating things is the fact that some roles 804 may depend on other roles, e.g., a role of "data scientist" can assume all privileges (e.g., policy attachments) granted to one or more other roles—here, "customer service" and "analyst."

Finally, multiple users 806 can be associated with one or multiple roles, such as user "Kate" being associated with roles for "admin" and "customer service" and "analyst," while user "Jane" is associated with role "data scientist."

Using such custom-selected priority values, the application of various dynamic masking policies can be easily understood and modified. As shown, each user may have one or more candidate masking policies 850 that could be applied for a particular query, and one of these policies can straightforwardly be selected as the one for use by identifying which candidate masking policy has a highest priority value.

For example, the user "Bob" may be directly associated with the "auditor" role and indirectly associated with the "admin" role, and thus the candidate masking policies for Bob may be DDM Policies "1" and "2." Thereafter, from these two candidates, masking policy "1" is selected as the one for use by determining that its priority value of "400" is larger than any other candidate policy's priority value (here, only "300"). As another example, user "Jane" may have candidate policies "3" and "4", while policy "3" is selected due to its priority value (of "200") being larger than that of policy "4" (of "100"). As yet another example, user "Kate"

may have candidate policies "1" and "2" and "3" and "4," while policy "2" is selected due to its priority value (of "300") being larger than that of any other ("200" for policy "3", "100" for policy "4", and "150" for the attachment of policy "1").

Figure 9:
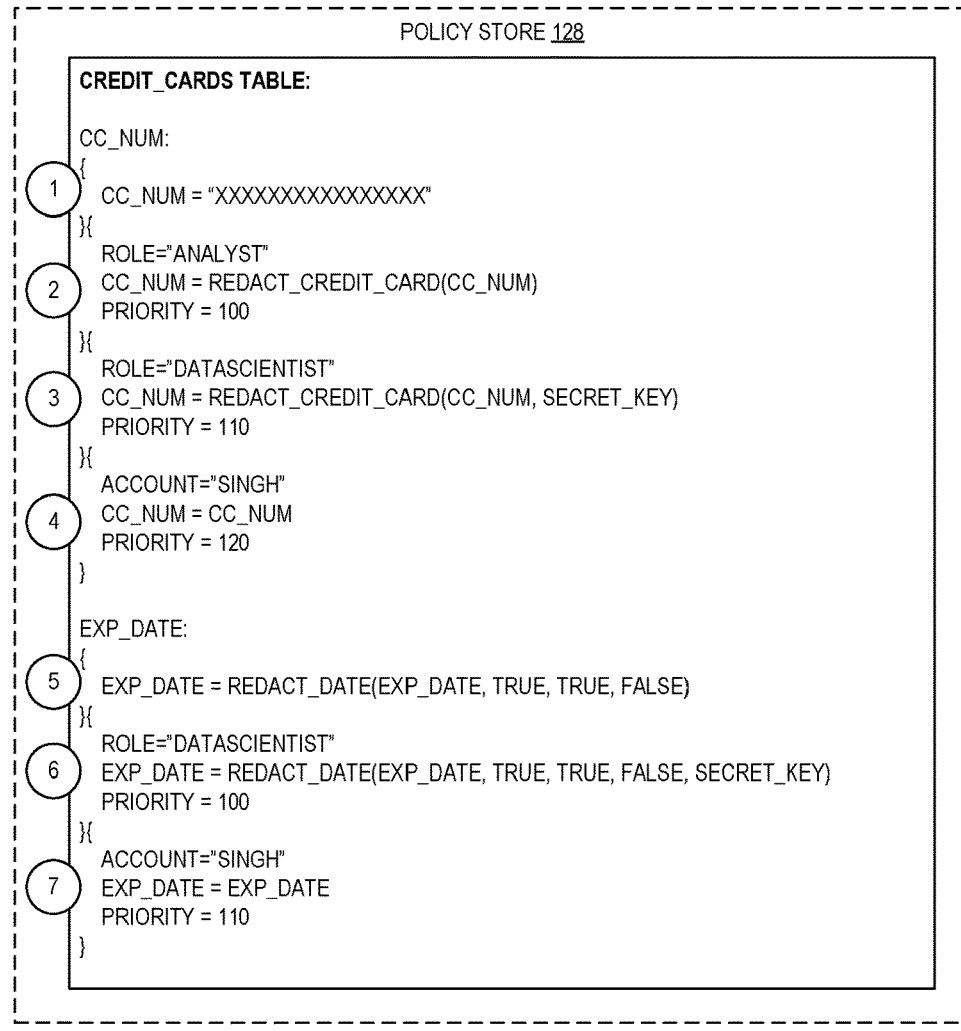
FIG. 9 is a diagram illustrating a more specific example via a logical representation of various masking policies attached to various columns of a table according to some examples.

Another slightly more complex exploration of policies is shown in FIG. 9, which is a diagram illustrating a more specific example via a logical representation of various masking policies attached to various columns of a table according to some examples.

The representation 900 of policies illustrates various policies attached to two different columns—CC_NUM and EXP_DATE. Circles (1)-(4) illustrate four different policies for CC_NUM, whereby a first policy for CC_NUM provides a static masking expression, which here is interpreted as being applicable to all users (e.g., is a "PUBLIC" attachment) and having a default priority value (here, assumed to be zero). The second policy for role "analyst" has a priority value of 100 and uses a REDACT_CREDIT_CARD function, while the third policy for role "datascientist" has a priority value of 110 and uses a pseudonymous REDACT_CREDIT_CARD function for key-based deterministic redaction, and the fourth policy for a user account "SINGH" has a priority value of 120 and does not perform any masking.

Likewise, circles (5)-(7) illustrate three different policies for EXP_DATE, whereby the first policy provides a masking expression involving use of a REDACT_DATE function, which here is interpreted as being applicable to all users (e.g., is a "PUBLIC" attachment) and having a default priority value (here, assumed to be zero). The second policy, associated with circle (6), is for role "datascientist" has a priority value of 100 and uses a pseudonymous REDACT_DATE function for key-based deterministic redaction, while the third policy for a user account "SINGH" has a priority value of 110 and does not perform any masking.

Accordingly, by default, queries involving CC_NUM will have a static masking of "X" characters returned, and queries involving EXP_DATE will have their dates redacted with obfuscated days and months (per the trailing arguments of TRUE, TRUE, and FALSE). Then, for any analyst, their queries involving CC_NUM will have the value redacted. Queries for users of role "dataanalyst" will similarly have their CC_NUM values redacted, albeit via the pseudonymous version of the function, while their queries involving EXP_DATE will have their values redacted using the pseudonymous version of the REDACT_DATE function. Finally, for user "SINGH," neither the CC_NUM or EXP_DATE values will be redacted whatsoever. This is reflected in table 950, highlighting how different candidate policies will be considered for various users and how the "winning" masking policy is selected.

Another example of a more complex set of policies attached to a table is shown in FIG. 10, which is a diagram illustrating logical representations of various masking policies attached to various columns of a table according to some examples. In this figure, a representation 1032 of various masking policies is shown with three policies. Each of these policies operates on multiple different inputs and generates multiple different outputs. Further, the first policy ("POLICY1") has a different number of outputs than inputs—here, more—though examples can also support the use of more inputs than outputs.

As described herein, a masking policy can be treated as a standalone object that defines how a given set of columns (as generic "inputs") are masked to produce a different set of masked columns (i.e., which transformation functions are applied to the values stored in the columns of a given record to be masked). A same policy can then be applied to multiple relations (tables, regular views, materialized views, late-binding views, etc.), to multiple columns on these relations, and/or to multiple users and roles. Innovatively, one policy can mask multiple columns, and when the policy is applied, the user specifies the correspondence between the columns of the relation and the inputs and outputs of the policy—thus, the names (used in the policy and the names of the columns in the relations) do not even have to match. For example, the representation of attachments 1033 indicates, for the first policy "1", which columns are to act as the inputs for the policy, and which columns the outputs of the policy are to be used as—here, five columns of input are mapped and six columns of output are mapped.

This mechanism also integrates well with the existing Role-Based Access Control (RBAC) infrastructure: the policies can be attached to RBAC roles and users, and the masking policy itself can be a grantee of a privilege, for example, when the policy's masking expression accesses another database object.

Thus, policies—which define masking expressions but are not relation-specific—and applications of these policies, which control the users/roles/relations to which the policy applies, allows users to reduce the duplication of effort, centralize the management of the policies, and have a clear security posture at a glance.

Moreover, in some examples the application of policies to multiple users, roles, relations, and/or columns is beneficially granular, allowing users to write a single policy once and apply it multiple times. Applying a policy to users and roles can eliminate the need to check the querying user/role in the policy expression itself. Checking the user from inside the policy would have been prone to errors, slow (running over every record, even if the policy should not apply to the user), and less maintainable (users and roles can be dropped and usernames can be changed).

Further, in some examples these polices can be multi-input and/or multi-output, meaning that one single policy can mask more than one column. This functionality can provide benefits to users with stronger security requirements, where it must be proven and enforced that at all times the entire set of columns is masked and it cannot happen that one column is masked while another one is not.

In some examples, the integration with existing RBAC system lets this system inherit the security guarantees of the access control and reduces the number of new concepts and interactions a user needs to learn. Further, configuring a policy be a grantee in RBAC benefits customers by letting them set the most granular privilege control. Thus, a masking policy will not be able to access an object that was not granted to it.

For more detail, as shown the first policy generates two values (col1, col2) based on performing an HMAC with both as inputs and taking different portions of the result as the col1 output and the col2 output. Further, a col3 value is redacted using a built-in REDACT_SSN function, a col4 value is redacted using a built-in REDACT_DATE function, and a col5 value is redacted using a built-in REDACT_EMAIL, while a col6 value is masked using a static string of "X" characters.

The second policy, in contrast, only masks three values in and out, whereas the third policy masks four values in and out.

These three policies can be attached in a variety of ways. One example is shown at the bottom of the figure as a representation 1033 of the attachments, where a first attachment associates the first policy with a "customers" table for all users (in this example, via "ROLE=*") with a default priority value of zero. The second attachment associates the second policy—also with the with the customers table—but for users of a role "sales_analyst" at a priority value of 1. Finally, the third attachment associates the third policy with the customers table for users of role "datascientist" and at a priority value of 2.

Notably, these policies affect different combinations of columns. For example, all three policies are used to redact the "email" column, though only the first policy is used to redact the "first_name" column. Thus, in some examples, upon receipt of a query, the leader node 124 determines redaction policies on a column-by-column basis, e.g., by identifying all policies, for that user or groups associated with the user, that are attached to the table of interest and that involve the column of interest. Thus, while on a table/relation basis the user may have multiple candidate policies, on a column level the user may have fewer candidate policies.

If, for example, a query issued on behalf of a user of role "sales_analyst" involves the "first_name" column as well as the "last_name" column, the leader node 124 can determine candidate policies on a column-by-column basis. Thus, the leader node 124 can determine that only one attachment involves the first_name column for the user (i.e., the first policy), so the masking expression for policy 1 is used for the first_name column.

However, the leader node 124 then can determine that two different attachments (and thus, two different policies) are candidates for the "last_name" column for that user—both policy 1 and policy 2—and based on comparing the priority values of these attachments, can determine that the masking expression of policy 2 is to be used for the last_name column.

Notably, these flexible policies and attachments can powerfully support a wide variety of use cases. As one simple example, a single policy (e.g., configured to mask email addresses) can be used multiple times for a same relation (e.g., to mask both an "personal_email" column and a "business_email" column), and thus if the policy needs to change (e.g., to use a different type of redaction) it can be managed in one place (via the single policy) and thus automatically updated for all columns it is attached to. This effect can be magnified when a policy is used for many columns in many relations.

Figure 11:
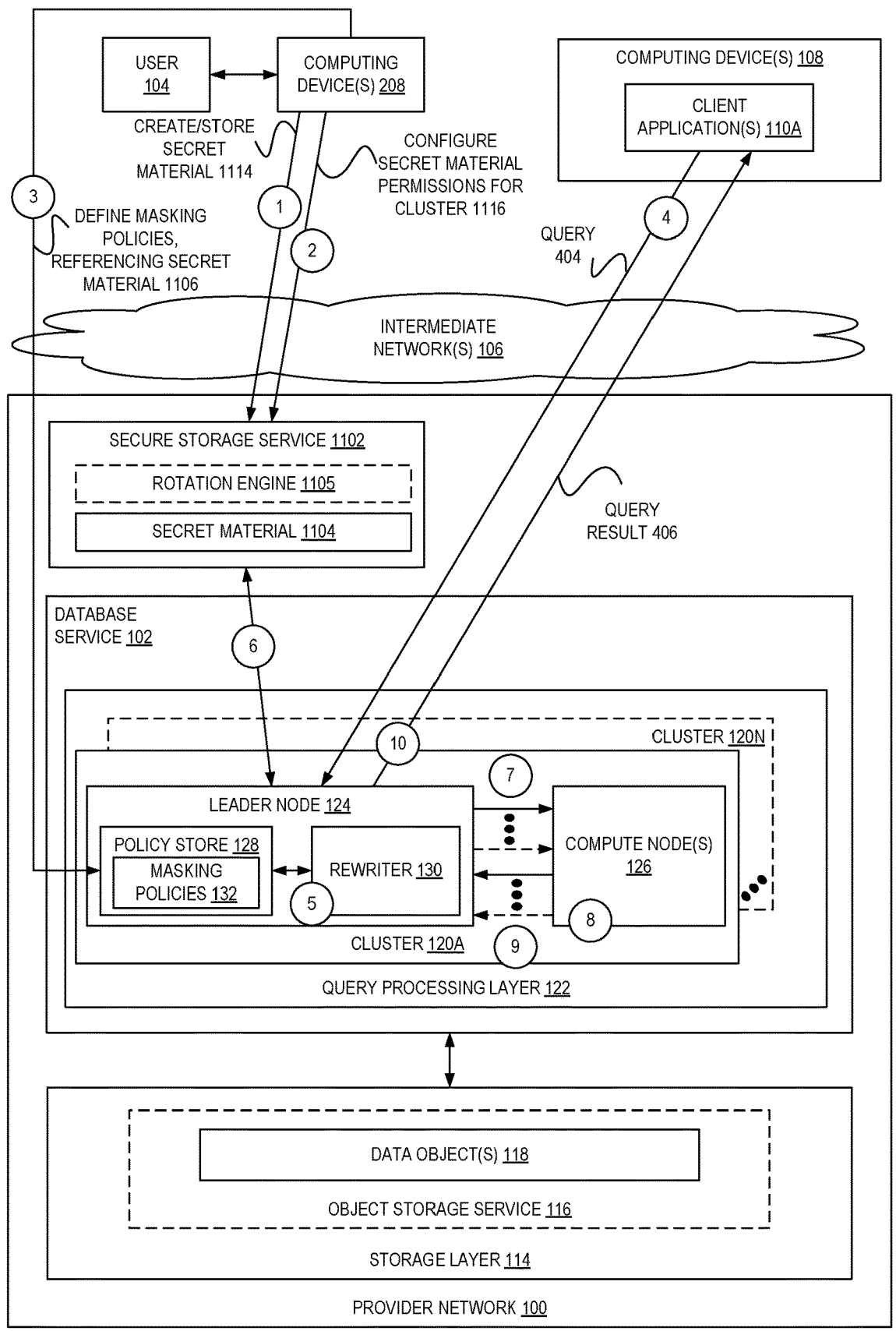
FIG. 11 is a diagram illustrating secure secret material storage and use for pseudonymous redaction functions within a multi-tenant service provider network that implements user-configurable dynamic data masking according to some examples.

As indicated herein, the use of key-based cryptographic functions for deterministic hashing is used in many examples. FIG. 11 is a diagram illustrating secure secret material storage and use for pseudonymous redaction functions within a multi-tenant service provider network that implements user-configurable dynamic data masking according to some examples. In order to use the key-based cryptographic functions (e.g., an HMAC function, or redaction function that is reliant on the HMAC function), the user needs to supply a secret material (e.g., a cryptographic key). However, secret material is a highly sensitive asset that requires maximum care through their entire lifetime: from securely generating it, to storing, using, rotating and destroying it.

One naive (and extremely insecure) way to supply the secret material is to have a user put the secret material directly in the policy definition itself (e.g., masked_email=HMAC(email, 'ExampleKey')). However, this approach would be unsafe and contrary to generally recognized security practices and requirements because secret material should never be exposed in this fashion—e.g., a policy definition is not rotated, it is visible to all superusers and security administrators, and is generally not protected at a level required for secret material such as a key.

To solve the security challenge, while making it simple and seamless for users to use the secret material, examples introduce an integration of the database service 102 with a secure storage service (also referred to as a "secrets manager," such as AWS Secrets Manager™). This way, instead of hard-coding secret material into a policy definition, the user instead references the secret material by its unique identifier within the secrets manager (e.g., an Amazon Resource Name (ARN) for AWS Secrets Manager™). Thus, the use of an external secrets service solves the problem of storage and rotation of the secret material, and since it is a single point of access for the secret material, the service can control and log the accesses. In the case of dynamic data masking, the access to the secret material from a masking policy and accesses to the secret material outside of it can be differentiated. Because dynamic data masking policies and the entire dynamic data masking mechanism can be implemented at a cluster-level, the secret material reference from within the dynamic data masking policy can use the cluster's identity to access the secret material. Otherwise, the querying user's identity is used. In this manner, a user can provision one set of secret material specifically for data masking and be sure that this secret material is never misused, while any given user can use secret-based cryptographic functions for data masking with their own secret material (e.g., encryption keys).

Beneficially, the secret material is thus never visible in plaintext, as it is not stored in catalogs, in policy definitions, or in any database service storage. Further, in some examples, the external secrets manager is by definition capable of securely storing, rotating and destroying the secret material. By integration in this manner, this functionality is brought from the external secrets manager and provided to the database engine. Also, compliance-minded users can also choose a secrets manager that is compliant with their policy.

In some examples, the database service 102 uses the secret material to the least extent possible to achieve functionality. The secret material can be retrieved at the latest possible time during query processing and be securely purged from memory right after it is used.

Further, in this arrangement the external secrets manager can control and log accesses to the secret material, and the user can beneficially revoke access to the secret material at any time. In some examples, the access to the secret material can be granular: the database can request the secret material as a cluster (e.g., with the identity of the cluster), or as a particular user. The user may thus control which piece of secret material is accessible to which entity.

With reference to FIG. 11, at circle (1) the user 104 (e.g., an administrator type persona for an organization) can send one or more commands to a secure storage service 1102 (also referred to as an external secrets manager or the like) to generate and/or store one or more items of secret material 1104. Secret material 1104 can be of a variety of types and/or formats, and may include or be an encryption key or hashing key, a random generator seed, a randomly generated set of bits, an authorization token, a password, etc. Thus, the secret material 1104 can be represented using a set of numeric values (e.g., a number), alphanumeric text, a binary value, etc. Additionally, while the term "secret material" may be used somewhat synonymously with the term "key," it is to be understood that while secret material can be a key in some examples it may also be other things as indicated herein.

The user 104 may also at circle (2) configure access permissions for the secret material 1104, e.g., to allow the cluster to access the secret material 1104, such as by providing an identifier of the cluster and/or database service 102 and/or the leader node 124 to indicate that they have read-only access to the secret material 1104. The user 104 may optionally also configure rotation of the secret material 1104 at this step, which can be performed by an optional rotation engine 1105 of the secure storage service 1102 (e.g., that performs cryptographic key rotation as is known to those of skill in the art).

In some examples, the leader node 124 (or cluster and/or database service 102) may thus access the secret material using its own identity information or credentials, as it has already been giving access to the secret material. However, in some examples, the leader node 124 (or cluster and/or database service 102) may access secret material using the identity of the querying user, such as when the user is directly calling a redaction function (as opposed to when the user is not querying using a redaction function, but the redaction function is instead being used as part of masking—in this case, the identity of the leader node 124 is used). Thus, based on the context of the query (e.g., determining whether the redaction function is or is not being directly invoked by the querying user), the leader node 124 (or cluster and/or database service 102) may thus determine which identity/credential to use for obtaining the secret material, and thereafter use that identity/credential to obtain it.

Thereafter, during the creation of masking policies (e.g., by sending one or more commands to define a masking policy definition), the user 104 may provide an identifier of the secret material 1104, such as through use of a secret identifier within an argument/parameter of a redaction function call.

Thereafter, for a query 404 at circle (4) received by the leader node 124, the leader node 124 can determine that a masking policy is involved and identify the secret identifier within that masking policy. Along with rewriting the query at circle (5), the leader node 124 may obtain the secret material 1104 (e.g., a cryptographic key) at circle (6) via a secure/encrypted tunnel or message, or the like. At circle (7), the leader node 124 can send the rewritten query and the secret material 1104 itself (again, via a secure/encrypted tunnel or message) to each compute node 126 that needs to execute the function (requiring use of the secret material 1104). At this point, the leader node 124 can immediately and securely delete the secret material 1104 from its memory. At circle (8), each node can use the secret material 1104 as part of the execution of the redaction function(s), and as soon as possible thereafter, securely delete the copy of the secret material 1104 from its memory. In many cases results are sent back at circle (9) to the leader node 124 to be sent back to the client application 110A as query result 406 at circle (10). In other examples, each individual compute node 126 may separately request a copy of the secret material 1104 from the secure storage service 1102, however. Further, in some examples, the system may be beneficially architected to limit the possible use of the secret material, e.g., by only allowing it to be used for calling a masking function (e.g., for loading into an HMAC function) and prohibiting other uses of it.

Figure 12:
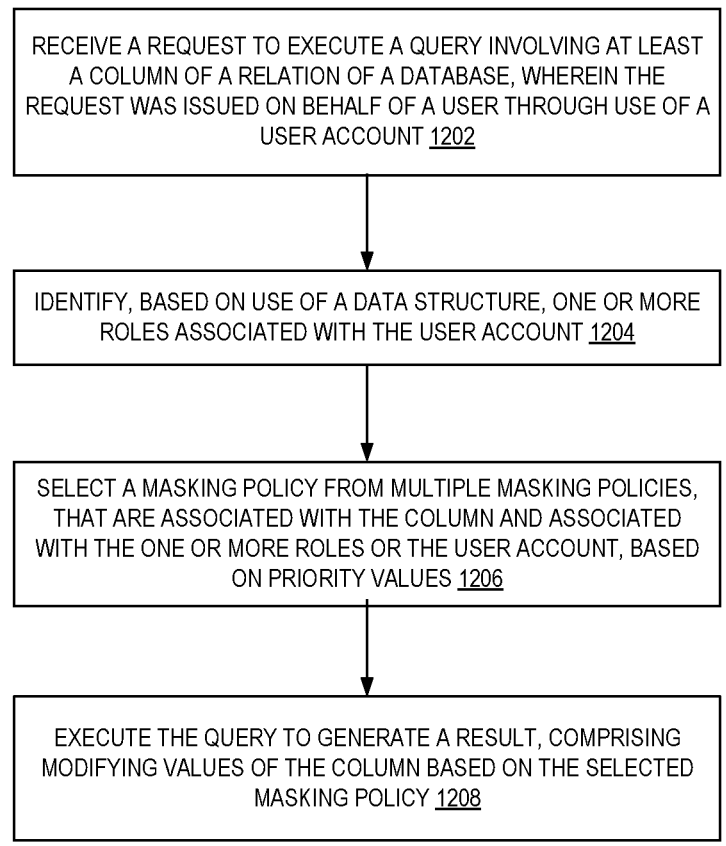
FIG. 12 is a flow diagram illustrating operations of a method for priority-based masking policy selection in a database environment according to some examples.

FIG. 12 is a flow diagram illustrating operations of a method for priority-based masking policy selection in a database environment according to some examples. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1200 are performed by the database service 102 of the other figures.

The operations 1200 include, at block 1202, receiving (e.g., at a database service) a request to execute a query involving at least a column of a relation of a database, where the request was issued on behalf of a user through use of a user account. The request may be originated within, or outside of, a multi-tenant service provider network, and the request may be received by a database service of the multi-tenant service provider network.

The operations 1200 further include, at block 1204, identifying, based on use of a data structure, one or more roles associated with the user account. The identifying may be based on performing an authorization and/or authentication process known to those of skill in the art in association with the received query, and may include performing a lookup in one or more data structures (e.g., to identify roles associated with a particular user account, which itself was identified based on data or metadata carried with the query).

The operations 1200 further include, at block 1206, selecting a masking policy from multiple masking policies, that are associated with the column and associated with the one or more roles or the user account, based on priority values. In some examples, the priority values are user-configured priority values associated with attachments of the multiple masking policies to the relation. In some examples, the masking policy is selected from the multiple masking policies that are associated with the column by identifying the masking policy as having a largest or a smallest priority value from the priority values of the multiple masking policies.

In some examples, selecting the masking policy from multiple masking policies comprises identifying, via use of a first data structure, a plurality of masking policies that have been attached to the relation and that output values for the column; and selecting, for inclusion in the multiple masking policies, those of the plurality of masking policies that apply to any of the one or more roles or the user account. In some examples, selecting the masking policy from multiple masking policies further includes selecting, for inclusion in the multiple masking policies, those of the plurality of masking policies that apply to all users or user roles.

At block 1208, the operations 1200 further include executing the query to generate a result, comprising modifying values of the column based on the selected masking policy.

In some examples, the query further involves a second column of the relation, and the operations 1200 further include: selecting a second masking policy from a second set of multiple masking policies that are associated with the second column based on use of the one or more roles the user account, where block 1208 (executing the query) further includes modifying values of the second column based on the selected second masking policy.

In some examples, the operations 1200 further include receiving (e.g., at the database service) a request to define the masking policy originated on behalf of a second user via use of a second user account, and in some examples, the operations 1200 further include receiving (e.g., at the database service) a request to attach the masking policy to the relation. In some examples, the request to attach the masking policy to the column includes a priority value specified by the second user, and in some examples the masking policy indicates that values are to be modified based at least in part on use of a cryptographic function. In some examples, the masking policy indicates that the values are to be modified via use of an email address masking function; a date masking function; a national identification number masking function; or a financial account number masking function.

Figure 13:
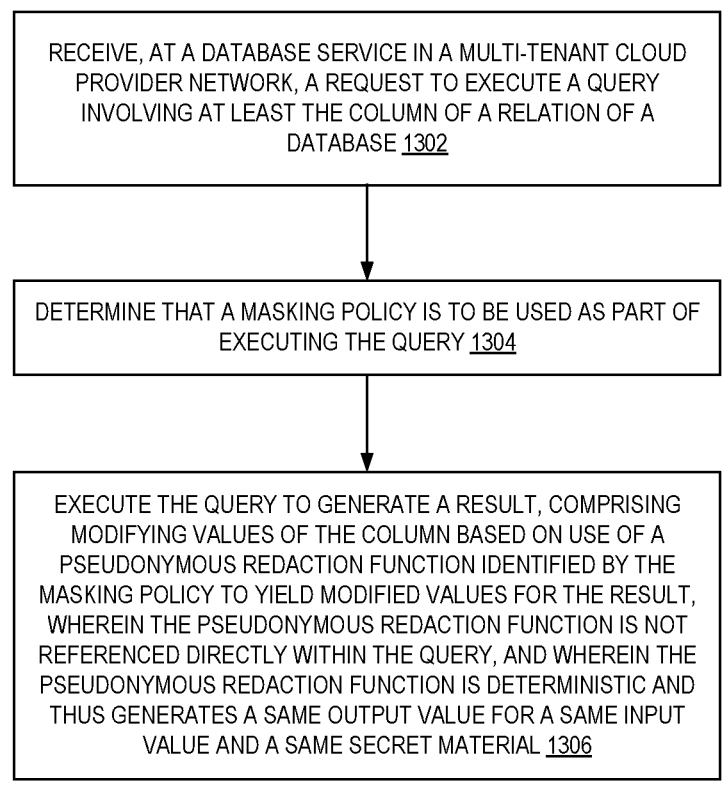
FIG. 13 is a flow diagram illustrating operations of a method for pseudonymized redaction in a database service according to some examples.

FIG. 13 is a flow diagram illustrating operations of a method for pseudonymized redaction in a database service according to some examples. Some or all of the operations 1300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1300 are performed by the database service 102 of the other figures.

The operations 1300 include, at block 1302, receiving (e.g., at a database service in a multi-tenant cloud provider network) a request to execute a query involving at least the column of a relation of a database.

The operations 1300 further include, at block 1304, determining that a masking policy is to be used as part of executing the query. In some examples, the masking policy includes an identifier of a secret material to be used within the pseudonymous redaction function. In some examples, the pseudonymous redaction function utilizes a hash-based message authentication code (HMAC) function.

The operations 1300 further include, at block 1306, executing the query to generate a result, comprising modifying values of the column based on use of a pseudonymous redaction function identified by the masking policy to yield modified values for the result, wherein the pseudonymous redaction function is not referenced directly within the query, and wherein the pseudonymous redaction function is deterministic and thus generates a same output value for a same input value and a same secret material. In some examples, the modified values remain semantically correct for the type of data stored as the values of the column.

In some examples, the pseudonymous redaction function comprises one of: an email address masking function that generates, from an input value of a valid email address type, an output value of the valid email address type; a date masking function that generates, from an input value of a valid date type, an output value of the valid date type; a national identification number masking function that generates, from an input value of a valid national identification number type, an output value of the valid national identification number type; or an account number masking function that generates, from an input value of a valid account number type, an output value of the valid account number type.

In some examples, the operations 1300 further include receiving (e.g., at a database service) a request to create the masking policy, the request identifying the pseudonymous redaction function implemented by the database service; and receiving a request to attach the masking policy to the relation of the database.

In some examples, block 1306 (executing the query) further includes rewriting the query, based on the masking policy, to yield a rewritten query, wherein the rewritten query includes a reference to a function that implements the pseudonymous redaction function, wherein the query did not include the reference to the function. In some examples, block 1306 (executing the query) further comprises providing the rewritten query to one or more compute nodes of the database service for use in generating one or more intermediate query results, wherein the one or more compute nodes apply the function to values of the column; and generating the result based on the one or more intermediate query results. In some embodiments, the reference to the function is within a subquery of the rewritten query that is not present in the query.

In some examples, modifying values of the column based on use of the pseudonymous redaction function comprises, for a first value of the column: providing the first value as an input to the pseudorandom function to generate an output; and deterministically generating one or more portions based on the output, wherein the corresponding modified value includes the one or more portions.

Figure 14:
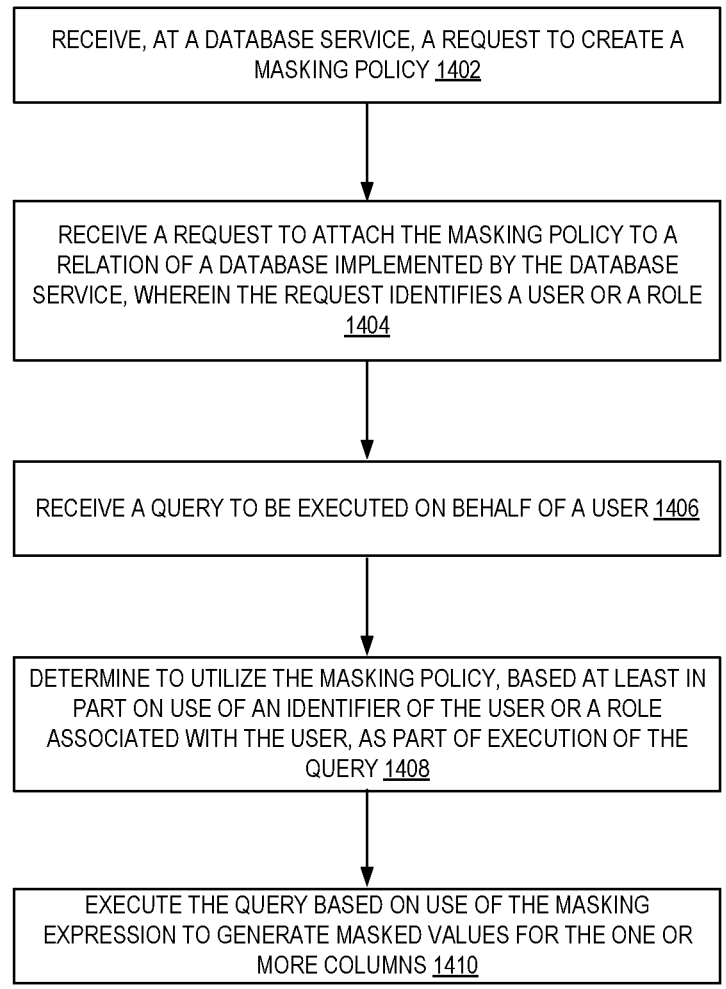
FIG. 14 is a flow diagram illustrating operations of a method for flexible database redaction using modular masking policies according to some examples.

FIG. 14 is a flow diagram illustrating operations of a method for flexible database redaction using modular masking policies according to some examples. Some or all of the operations 1400 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1400 are performed by the database service 102 of the other figures.

The operations 1400 include, at block 1402, receiving (e.g., at a database service) a request to create a masking policy. In some examples, the request to attach the masking policy further identifies multiple columns of the relation that are to be provided as inputs to the masking policy. In some examples, this masking policy generates masked values for a single column, while in other examples, the masking policy generates masked values for multiple columns.

In some examples, the request to create a masking policy includes a masking expression that references another relation or a user-defined function (UDF). In some examples, the operations 1400 further include receiving a request to grant a permission to the masking policy, wherein the permission allows the masking policy to access a database object.

The operations 1400 further include, at block 1404, receiving a request to attach the masking policy to a relation of a database implemented by the database service, wherein the request identifies a user or a role. In some examples, the request to attach the masking policy to the relation further includes the identifier of the user or the role. In some examples, the request to attach the masking policy to the relation further identifies a priority value for the attachment than can be utilized to determine whether the masking policy is to be applied.

The operations 1400 further include, at block 1406, receiving a query to be executed on behalf of a user, and at block 1408, determining to utilize the masking policy, based at least in part on use of an identifier of the user or a role associated with the user, as part of execution of the query.

The operations 1400 further include, at block 1410, executing the query based on use of the masking expression to generate masked values for the one or more columns.

In some examples, the operations 1400 further include receiving a request to attach the masking policy to a second relation of the database; and executing another query based on use of the masking expression to generate masked values for another one or more columns of the second relation. In some examples, the masking expression includes an invocation of a pseudonymous redaction function. In some examples, the operations 1400 further include determining, as part of the execution of the query, to use a second masking policy to mask values of a second column of the relation.

FIG. 15 is a flow diagram illustrating operations 1500 of a method for dynamic database redaction using protected secret material according to some examples. Some or all of the operations 1500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1500 are performed by the database service 102 of the other figures.

The operations 1500 include, at block 1502, receiving a request to execute a query involving at least a column of a relation of a database.

The operations 1500 further include, at block 1504, executing the query to generate a result, comprising modifying values of the column based on use of secret material and a pseudonymous redaction function implemented by the database service to yield modified values for the result, wherein executing the query comprises obtaining a copy of the secret material, from a separate system, via use of an identifier of the secret material.

In some examples, the separate system comprises a secrets manager service implemented within a multi-tenant service provider network. In some examples, the operations 1500 further include receiving, at the secrets manager service, a request to store the secret material or to generate and store the secret material; encrypting, by the secrets manager service, the secret material; and storing the encrypted secret material in a non-volatile storage medium. In some examples, the operations 1500 further include configuring, by the secrets manager service, an entity of the database service to have permission to access the secret material, wherein the entity is one of a leader node of a cluster, the cluster, or a compute node.

In some examples, obtaining a copy of the secret material includes determining, based on a context of the query, an identity or credential to use to obtain the secret material, where the obtaining the copy of the secret material includes sending a request, by the leader node of the cluster to the secrets manager service, for the secret material via use of the determined identity or credential.

In some examples, executing the query includes transmitting the secret material by the leader node to one or more compute nodes of the cluster via one or more encrypted channels or messages. In some examples, the deleting of the copy of the secret material is performed by the leader node after the transmitting of the secret material by the leader node. Each of the one or more compute nodes, in some examples, utilizes the secret material to execute pseudonymous redaction function and thereafter deletes the secret material.

In some examples, the operations 1500 further include rotating the secret material, by the secrets manager service, to instead designate an updated secret material for use by the entity of the database service.

In some examples, the secret material itself is not within the masking policy, and wherein the secret material is not directly accessible by a user that issued the query. The secret material, in some examples, is not directly accessible by a user that issued the query.

Figure 16:
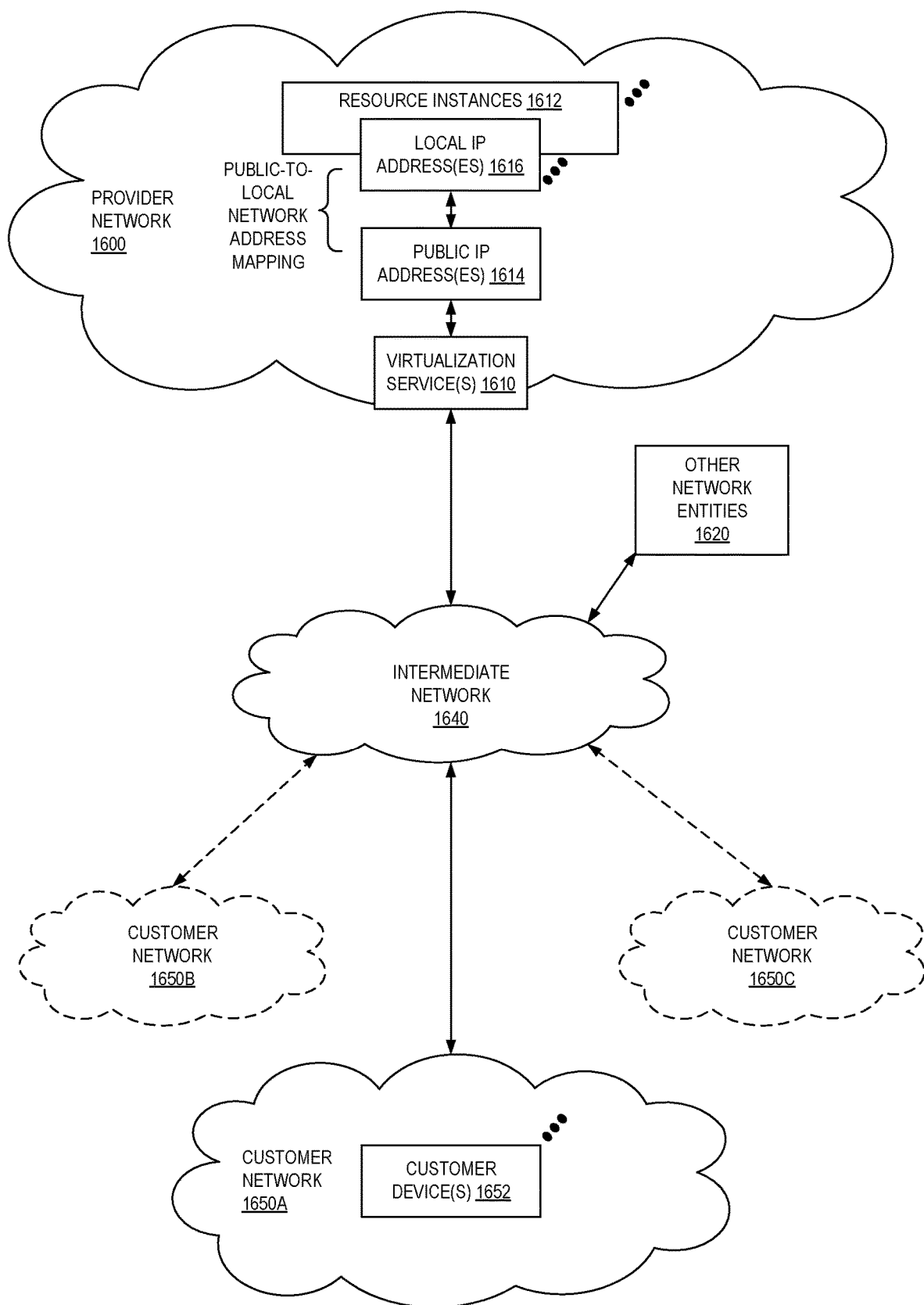
FIG. 16 illustrates an example provider network environment according to some examples.

FIG. 16 illustrates an example provider network (or "service provider system") environment according to some examples. A provider network 1600 can provide resource virtualization to customers via one or more virtualization services 1610 that allow customers to purchase, rent, or otherwise obtain instances 1612 of virtualized resources, including but not limited to computation and storage resources, implemented on devices within the provider network or networks in one or more data centers. Local Internet Protocol (IP) addresses 1616 can be associated with the resource instances 1612; the local IP addresses are the internal network addresses of the resource instances 1612 on the provider network 1600. In some examples, the provider network 1600 can also provide public IP addresses 1614 and/or public IP address ranges (e.g., Internet Protocol version 4 (IPv4) or Internet Protocol version 6 (IPv6) addresses) that customers can obtain from the provider 1600.

Conventionally, the provider network 1600, via the virtualization services 1610, can allow a customer of the service provider (e.g., a customer that operates one or more customer networks 1650A-1650C (or "client networks") including one or more customer device(s) 1652) to dynamically associate at least some public IP addresses 1614 assigned or allocated to the customer with particular resource instances 1612 assigned to the customer. The provider network 1600 can also allow the customer to remap a public IP address 1614, previously mapped to one virtualized computing resource instance 1612 allocated to the customer, to another virtualized computing resource instance 1612 that is also allocated to the customer. Using the virtualized computing resource instances 1612 and public IP addresses 1614 provided by the service provider, a customer of the service provider such as the operator of the customer network(s) 1650A-1650C can, for example, implement customer-specific applications and present the customer's applications on an intermediate network 1640, such as the Internet. Other network entities 1620 on the intermediate network 1640 can then generate traffic to a destination public IP address 1614 published by the customer network(s) 1650A-1650C; the traffic is routed to the service provider data center, and at the data center is routed, via a network substrate, to the local IP address 1616 of the virtualized computing resource instance 1612 currently mapped to the destination public IP address 1614. Similarly, response traffic from the virtualized computing resource instance 1612 can be routed via the network substrate back onto the intermediate network 1640 to the source entity 1620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1600; a customer can then assign their allocated public IP addresses to particular resource instances allocated to the customer. These public IP addresses can be referred to as customer public IP addresses, or simply customer IP addresses. Instead of being assigned by the provider network 1600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 17:
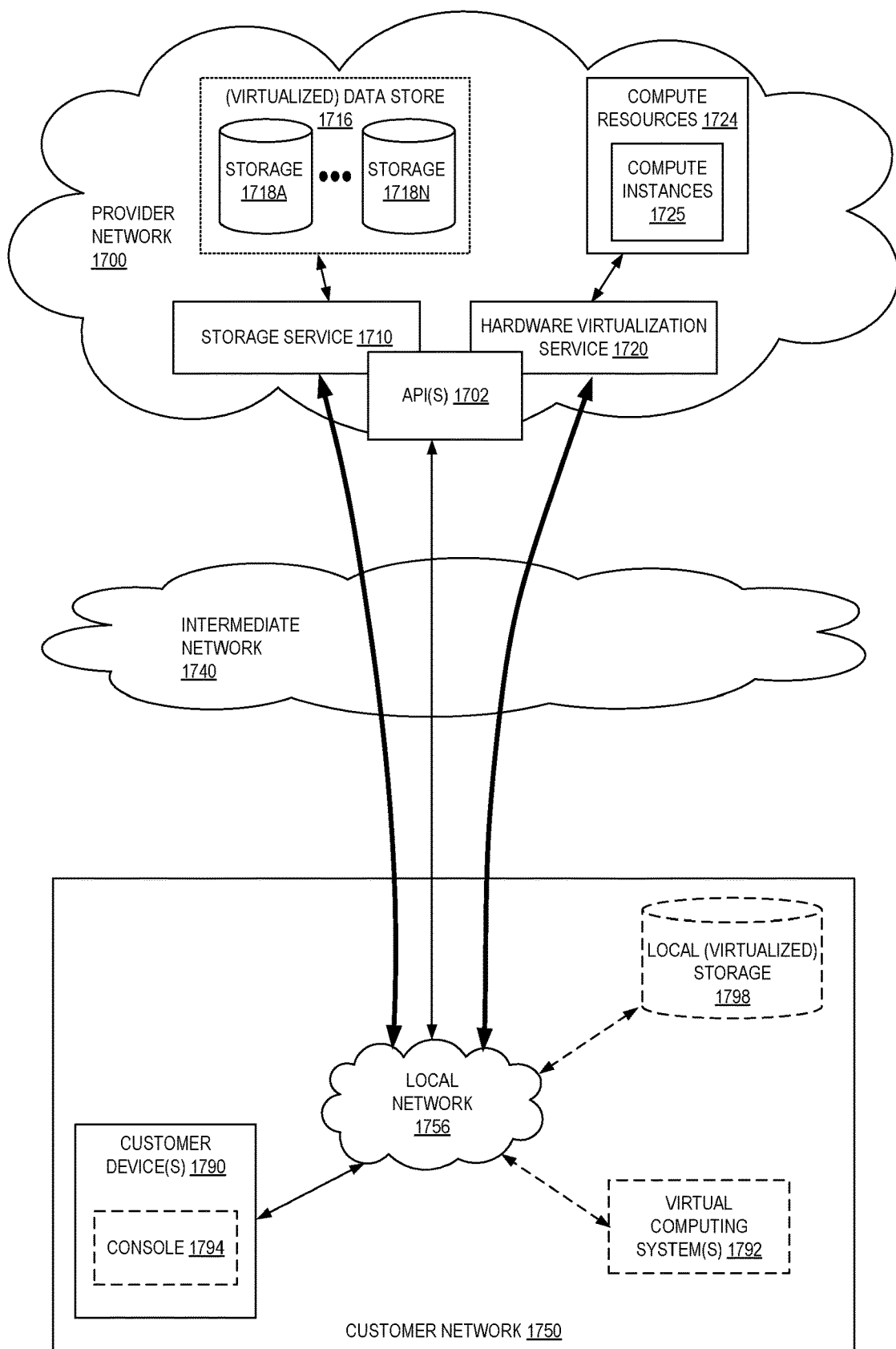
FIG. 17 is a block diagram of an example provider network that provides a storage service and a hardware virtualization service to customers according to some examples.

FIG. 17 is a block diagram of an example provider network environment that provides a storage service and a hardware virtualization service to customers, according to some examples. A hardware virtualization service 1720 provides multiple compute resources 1724 (e.g., compute instances 1725, such as VMs) to customers. The compute resources 1724 can, for example, be provided as a service to customers of a provider network 1700 (e.g., to a customer that implements a customer network 1750). Each computation resource 1724 can be provided with one or more local IP addresses. The provider network 1700 can be configured to route packets from the local IP addresses of the compute resources 1724 to public Internet destinations, and from public Internet sources to the local IP addresses of the compute resources 1724.

The provider network 1700 can provide the customer network 1750, for example coupled to an intermediate network 1740 via a local network 1756, the ability to implement virtual computing systems 1792 via the hardware virtualization service 1720 coupled to the intermediate network 1740 and to the provider network 1700. In some examples, the hardware virtualization service 1720 can provide one or more APIs 1702, for example a web services interface, via which the customer network 1750 can access functionality provided by the hardware virtualization service 1720, for example via a console 1794 (e.g., a web-based application, standalone application, mobile application, etc.) of a customer device 1790. In some examples, at the provider network 1700, each virtual computing system 1792 at the customer network 1750 can correspond to a computation resource 1724 that is leased, rented, or otherwise provided to the customer network 1750.

From an instance of the virtual computing system(s) 1792 and/or another customer device 1790 (e.g., via console 1794), the customer can access the functionality of a storage service 1710, for example via the one or more APIs 1702, to access data from and store data to storage resources 1718A-1718N of a virtual data store 1716 (e.g., a folder or "bucket," a virtualized volume, a database, etc.) provided by the provider network 1700. In some examples, a virtualized data store gateway (not shown) can be provided at the customer network 1750 that can locally cache at least some data, for example frequently accessed or critical data, and that can communicate with the storage service 1710 via one or more communications channels to upload new or modified data from a local cache so that the primary store of data (the virtualized data store 1716) is maintained. In some examples, a user, via the virtual computing system 1792 and/or another customer device 1790, can mount and access virtual data store 1716 volumes via the storage service 1710 acting as a storage virtualization service, and these volumes can appear to the user as local (virtualized) storage 1798.

While not shown in FIG. 17, the virtualization service(s) can also be accessed from resource instances within the provider network 1700 via the API(s) 1702. For example, a customer, appliance service provider, or other entity can access a virtualization service from within a respective virtual network on the provider network 1700 via the API(s) 1702 to request allocation of one or more resource instances within the virtual network or within another virtual network.

Illustrative Systems

Figure 18:
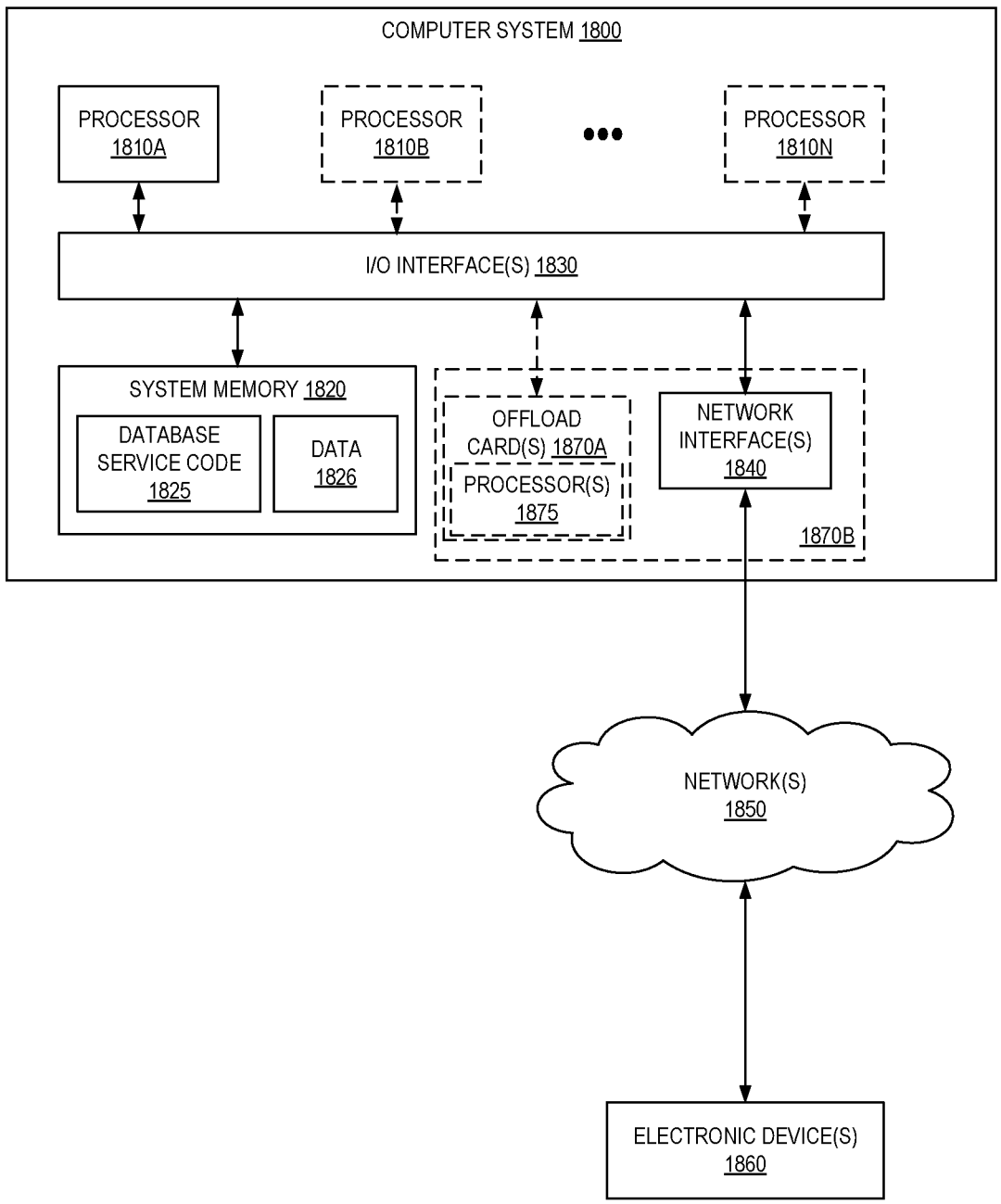
FIG. 18 is a block diagram illustrating an example computer system that can be used in some examples.

In some examples, a system that implements a portion or all of the techniques described herein can include a general-purpose computer system, such as the computer system 1800 illustrated in FIG. 18, that includes, or is configured to access, one or more computer-accessible media. In the illustrated example, the computer system 1800 includes one or more processors 1810 coupled to a system memory 1820 via an input/output (I/O) interface 1830. The computer system 1800 further includes a network interface 1840 coupled to the I/O interface 1830. While FIG. 18 shows the computer system 1800 as a single computing device, in various examples the computer system 1800 can include one computing device or any number of computing devices configured to work together as a single computer system 1800.

In various examples, the computer system 1800 can be a uniprocessor system including one processor 1810, or a multiprocessor system including several processors 1810

(e.g., two, four, eight, or another suitable number). The processor(s) 1810 can be any suitable processor(s) capable of executing instructions. For example, in various examples, the processor(s) 1810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1810 can commonly, but not necessarily, implement the same ISA.

The system memory 1820 can store instructions and data accessible by the processor(s) 1810. In various examples, the system memory 1820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1820 as database service code 1825 (e.g., executable to implement, in whole or in part, the database service 100) and data 1826.

In some examples, the I/O interface 1830 can be configured to coordinate I/O traffic between the processor 1810, the system memory 1820, and any peripheral devices in the device, including the network interface 1840 and/or other peripheral interfaces (not shown). In some examples, the I/O interface 1830 can perform any necessary protocol, timing, or other data transformations to convert data signals from one component (e.g., the system memory 1820) into a format suitable for use by another component (e.g., the processor 1810). In some examples, the I/O interface 1830 can include support for devices attached through various types of peripheral buses, such as a variant of the Peripheral Component Interconnect (PCI) bus standard or the Universal Serial Bus (USB) standard, for example. In some examples, the function of the I/O interface 1830 can be split into two or more separate components, such as a north bridge and a south bridge, for example. Also, in some examples, some or all of the functionality of the I/O interface 1830, such as an interface to the system memory 1820, can be incorporated directly into the processor 1810.

The network interface 1840 can be configured to allow data to be exchanged between the computer system 1800 and other devices 1860 attached to a network or networks 1850, such as other computer systems or devices as illustrated in FIG. 1, for example. In various examples, the network interface 1840 can support communication via any suitable wired or wireless general data networks, such as types of Ethernet network, for example. Additionally, the network interface 1840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1800 includes one or more offload cards 1870A or 1870B (including one or more processors 1875, and possibly including the one or more network interfaces 1840) that are connected using the I/O interface 1830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1800 can act as a host electronic device (e.g., operating as part of a hardware virtualization service) that hosts compute resources such as compute instances, and the one or more offload cards 1870A or 1870B execute a virtualization manager that can manage compute instances that execute on the host electronic device. As an example, in some examples the offload card(s) 1870A or 1870B can perform compute instance management operations, such as pausing and/or un-pausing compute instances, launching and/or terminating compute instances, performing memory transfer/copying operations, etc. These management operations can, in some examples, be performed by the offload card(s) 1870A or 1870B in coordination with a hypervisor (e.g., upon a request from a hypervisor) that is executed by the other processors 1810A-1810N of the computer system 1800. However, in some examples the virtualization manager implemented by the offload card(s) 1870A or 1870B can accommodate requests from other entities (e.g., from compute instances themselves), and can not coordinate with (or service) any separate hypervisor.

In some examples, the system memory 1820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1800 via the I/O interface 1830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1800 as the system memory 1820 or another type of memory. Further, a computer-accessible medium can include transmission media or signals such as electrical, electromagnetic, or digital signals, conveyed via a communication medium such as a network and/or a wireless link, such as can be implemented via the network interface 1840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1718A-1718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, at a database service, a request to create a masking policy, the request identifying a pseudonymous redaction function implemented by the database service, the request further including an identifier of a secret material that is stored in a separate system that is separate from the database service;
   receiving, at the database service, a request to attach the masking policy to a column of a table of a database;
   receiving, at the database service, a request to execute a query involving at least a column of a relation of the database; and
   executing the query to generate a result, comprising modifying values of the column based on use of the secret material and the pseudonymous redaction function of the masking policy to yield modified values for the result, wherein executing the query comprises:
   obtaining a copy of the secret material from the separate system, by a leader node of a cluster of the database service, via use of the identifier of the secret material;
   transmitting the copy of the secret material to each of one or more compute nodes of the cluster, via an encrypted channel or message, for use in modifying values of the column;
   deleting the copy of the secret material by the leader node; and
   deleting the copies of the secret material by the one or more compute nodes.

2. The computer-implemented method of claim 1, wherein:
   the separate system comprises a secrets manager service implemented within a multi-tenant service provider network; and
   a user stored the secret material with the secrets manager service and configured a permission for the leader node to access the secret material.

3. The computer-implemented method of claim 1, wherein:
   the pseudonymous redaction function includes use of a hash-based message authentication code (HMAC) function;
   the secret material itself is not within the masking policy; and
   the secret material is not directly accessible by a user that issued the query.

4. A computer-implemented method comprising:
   receiving, at a database service, a request to execute a query involving at least a column of a relation of a database; and
   executing the query to generate a result, comprising modifying values of the column based on use of secret material and a pseudonymous redaction function implemented by the database service to yield modified values for the result, wherein executing the query comprises obtaining a copy of the secret material, from a separate system that is separate from the database service, via use of an identifier of the secret material.

5. The computer-implemented method of claim 4, wherein the separate system comprises a secrets manager service implemented within a multi-tenant service provider network.

6. The computer-implemented method of claim 5, further comprising:
   receiving, at the secrets manager service, a request to store the secret material or to generate and store the secret material;
   encrypting, by the secrets manager service, the secret material; and
   storing the encrypted secret material in a non-volatile storage medium.

7. The computer-implemented method of claim 6, further comprising configuring, by the secrets manager service, an entity of the database service to have permission to access the secret material, wherein the entity is one of a leader node of a cluster of the database service, the cluster of the database service, or a compute node of the database service.

8. The computer-implemented method of claim 7, wherein obtaining the copy of the secret material comprises:
   determining, based on a context of the query, an identity or credential to use to obtain the secret material, and
   wherein the obtaining the copy of the secret material includes sending a request, by the leader node of the cluster to the secrets manager service, for the secret material via use of the determined identity or credential.

9. The computer-implemented method of claim 8, wherein executing the query comprises transmitting the secret material by the leader node to one or more compute nodes of the cluster via one or more encrypted channels or messages.

10. The computer-implemented method of claim 9, further comprising deleting the secret material, by the leader node, after the transmitting of the secret material by the leader node.

11. The computer-implemented method of claim 10, wherein each of the one or more compute nodes utilizes the secret material to execute the pseudonymous redaction function and thereafter deletes the secret material.

12. The computer-implemented method of claim 7, further comprising rotating the secret material, by the secrets manager service, to instead designate an updated secret material for use by the entity of the database service.

13. The computer-implemented method of claim 4, wherein the modifying of the values of the column occurs based on a selected masking policy, wherein the secret material itself is not within the masking policy, and wherein the secret material is not directly accessible by a user that issued the query.

14. The computer-implemented method of claim 4, further comprising:
receiving a request to create a masking policy, the request identifying the pseudonymous redaction function implemented by the database service, the request further including an identifier of the secret material that is stored in the separate system;
receive a request to attach the masking policy to the relation of a database; and
attaching the masking policy to the relation, comprising updating one or more data structures to associate the masking policy with the relation.

15. A system comprising:
a first one or more electronic devices to implement a secrets manager service in a multi-tenant service provider network; and
a second one or more electronic devices to implement a database service in the multi-tenant service provider network, the database service including instructions that upon execution cause the database service to:
receive a request to execute a query involving at least a column of a relation of a database; and
execute the query to generate a result, comprising modifying values of the column based on use of a secret material and a pseudonymous redaction function to yield modified values for the result, wherein to execute the query the database service is at least to obtain a copy of the secret material, from the secrets manager service that is separate from the database service, via use of an identifier of the secret material.

16. The system of claim 15, wherein the secret manager service is to:
receive a request to store the secret material or to generate and store the secret material;
encrypt the secret material; and
store the encrypted secret material in a non-volatile storage medium.

17. The system of claim 16, wherein the secret manager service is further to configure an entity of the database service to have permission to access the secret material, wherein the entity is one of a leader node of a cluster of the database service, the cluster of the database service, or a compute node of the database service.

18. The system of claim 17, wherein the database service, to obtain the copy of the secret material, is to:
send a request, by the leader node of the cluster to the secrets manager service, for the secret material, wherein the request is sent with an identity of the leader node that allows the secrets manager service to authorize the leader node as having permission to access the secret material; and
receive, by the leader node from the secrets manager service, the secret material via an encrypted channel or message.

19. The system of claim 18, wherein the database service, to execute the query, is to transmit the secret material by the leader node to one or more compute nodes of the cluster via one or more encrypted channels or messages.

20. The system of claim 15, wherein the database service further includes instructions that when executed cause the database service to:
receive a request to create a masking policy, the request identifying the pseudonymous redaction function implemented by the database service, the request further including an identifier of the secret material that is stored in the secret manager service but not including the secret material itself;
receive a request to attach the masking policy to the relation of a database; and
attach the masking policy to the relation, comprising updating one or more data structures to associate the masking policy with the relation.

* * * * *